United States Patent
Miyamoto et al.

(10) Patent No.: US 9,903,292 B2
(45) Date of Patent: Feb. 27, 2018

(54) ABNORMALITY DIAGNOSIS SYSTEM OF AIR-FUEL RATIO SENSOR

(71) Applicant: TOYOTA JIDOSHA KABUSHIKI KAISHA, Toyota-shi, Aichi-ken (JP)

(72) Inventors: Hiroshi Miyamoto, Shizuoka-ken (JP); Toru Kidokoro, Hadano (JP); Yasushi Iwazaki, Ebina (JP); Kenji Suzuki, Susono (JP); Koji Ide, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 164 days.

(21) Appl. No.: 14/921,198

(22) Filed: Oct. 23, 2015

(65) Prior Publication Data

US 2016/0115893 A1    Apr. 28, 2016

(30) Foreign Application Priority Data

Oct. 23, 2014    (JP) .................................. 2014-216579

(51) Int. Cl.
*F02D 41/14* (2006.01)
*F02D 41/22* (2006.01)

(52) U.S. Cl.
CPC ..... *F02D 41/1495* (2013.01); *F02D 41/1441* (2013.01); *F02D 41/1454* (2013.01); *F02D 41/1494* (2013.01); *F02D 41/222* (2013.01); *Y02T 10/40* (2013.01)

(58) Field of Classification Search
CPC ............... F02D 41/1495; F02D 41/222; F02D 41/1494; F02D 41/1441; F02D 41/1454; Y02T 10/40
See application file for complete search history.

(56) References Cited

U.S. PATENT DOCUMENTS 5,847,271 A * 12/1998 Poublon ................ F01N 11/007
                                                                                340/438
2004/0226282 A1    11/2004 Hattori
(Continued)

FOREIGN PATENT DOCUMENTS

| JP | 2000-055861 A | 2/2000 |
| JP | 2004-019542 A | 1/2004 |
| JP | 2005-036742 A | 2/2005 |

(Continued)

*Primary Examiner* — Hung Q Nguyen
*Assistant Examiner* — Xiao Mo
(74) *Attorney, Agent, or Firm* — Andrews Kurth Kenyon LLP

(57) ABSTRACT

An abnormality diagnosis system of limit current type air-fuel ratio sensors comprises a current detecting part and a sensor temperature control device. The abnormality diagnosis system uses the current detecting part to detect the output current of the air-fuel ratio sensor when the air-fuel ratio is made the rich air-fuel ratio in the state where temperature of the air-fuel ratio is made the first temperature and when the air-fuel ratio is made the rich air-fuel ratio in the state where the temperature of the air-fuel ratio is made a second temperature higher than the first temperature. It is judged that the air-fuel ratio sensor is abnormal if the output current when the temperature of the air-fuel ratio sensor is the first temperature is larger than the output current when it is the second temperature by a predetermined value or more.

17 Claims, 21 Drawing Sheets

(56) References Cited

U.S. PATENT DOCUMENTS

2007/0006860 A1* 1/2007 Nakamura .......... F02D 41/1495
123/688
2008/0066447 A1* 3/2008 Sawada ................ F01N 3/0842
60/276

FOREIGN PATENT DOCUMENTS

| JP | 200717191 A | 1/2007 |
| JP | 2010-174790 A | 8/2010 |
| WO | 2015/049726 A1 | 4/2015 |

* cited by examiner

ABNORMALITY DIAGNOSIS SYSTEM OF AIR-FUEL RATIO SENSOR

CROSS-REFERENCE TO RELATED APPLICATION

The present application claims priority to Japanese Patent Application No. 2014-216579 filed on Oct. 23, 2014, which is incorporated herein by reference in its entirety.

TECHNICAL FIELD

The present invention relates to an abnormality diagnosis system of an air-fuel ratio sensor arranged in an exhaust passage of an internal combustion engine.

BACKGROUND ART

In the past, in an internal combustion engine designed to control an air-fuel ratio to a target air-fuel ratio, it is known to arrange a limit current type air-fuel ratio sensor generating a limit current corresponding to the air-fuel ratio in an engine exhaust passage. In such an internal combustion engine, the amount of fuel fed to a combustion chamber is controlled by feedback by the air-fuel ratio sensor so that the air-fuel ratio becomes the target air-fuel ratio. In this regard, in this air-fuel ratio sensor, an element thereof is sometimes cracked, which results in the outer surface of the sensor element and the internal space of the sensor element being communicated. If an element cracking, the air-fuel ratio sensor can no longer generate a suitable output corresponding to the air-fuel ratio. As a result, the air-fuel ratio can no longer be accurately controlled by feedback to the target air-fuel ratio.

Therefore, an abnormality diagnosis system for detecting a crack of element of an air-fuel ratio sensor has been known in the past (for example, PTL 1). According to PTL 1, usually a voltage applied to an air-fuel ratio sensor is set to a center of a limit current region. If the sensor element of the air-fuel ratio sensor has cracked or if the platinum on the electrodes has shrunken, it is believed that the voltage applied to the air-fuel ratio sensor will deviate to the high voltage side from the center of the limit current region. Therefore, in the system described in this PTL 1, when the voltage applied to the air-fuel ratio sensor deviates to the high voltage side or low voltage side from the center part of the limit current region, it is judged that the sensor element of the air-fuel ratio sensor has cracked or the platinum on the electrodes has shrunken.

CITATIONS LIST

Patent Literature

PTL 1. Japanese Patent Publication No. 2010-174790A
PTL 2. Japanese Patent Publication No. 2000-55861A
PTL 3. Japanese Patent Publication No. 2004-19542A

SUMMARY OF INVENTION

Technical Problem

However, in the system described in PTL 1, it is not possible to reliably detect if the sensor element of an air-fuel ratio sensor has cracked. Therefore, in consideration of this problem, the object of the present invention is to provide an abnormality diagnosis system able to reliably detect a crack of element of an air-fuel ratio sensor.

Solution to Problem

To solve the above problem, the following inventions are provided.

(1) An abnormality diagnosis system of an air-fuel ratio sensor provided in an exhaust passage of an internal combustion engine and generating a limit current corresponding to an air-fuel ratio, comprising: a current detecting part detecting an output current of the air-fuel ratio sensor; and a sensor temperature control device controlling a temperature of the air-fuel ratio sensor, the system controls the temperature of the air-fuel ratio sensor to a first temperature by the sensor temperature control device and detects the output current of the air-fuel ratio sensor by the current detecting part, when the internal combustion engine controls the air-fuel ratio so that the air-fuel ratio of the exhaust gas flowing around the air-fuel ratio sensor becomes a rich air-fuel ratio in the state where the temperature of the air-fuel ratio sensor is made the first temperature, the system controls the temperature of the air-fuel ratio sensor to a second temperature higher than the first temperature by the sensor temperature control device and detects the output current of the air-fuel ratio sensor by the current detecting part, when the internal combustion engine controls the air-fuel ratio so that the air-fuel ratio of the exhaust gas flowing around the air-fuel ratio sensor becomes a rich air-fuel ratio in the state where the temperature of the air-fuel ratio sensor is made the second temperature, and the system judges that the air-fuel ratio sensor has become abnormal when the output current when controlling the temperature of the air-fuel ratio sensor to the first temperature is larger than the output current when controlling the temperature of the air-fuel ratio sensor to the second temperature by a predetermined value or more.

(2) The abnormality diagnosis system of an air-fuel ratio sensor according to above (1), wherein the system provisionally judges the air-fuel ratio sensor is abnormal when the internal combustion engine controls the air-fuel ratio so that the air-fuel ratio of the exhaust gas flowing around the air-fuel ratio sensor becomes a rich air-fuel ratio in the state where the temperature of the air-fuel ratio sensor is made the first temperature, if the output current of the air-fuel ratio sensor has become a current value indicating an air-fuel ratio equal to or greater than a predetermined lean air-fuel ratio leaner than the stoichiometric air-fuel ratio, when it is provisionally judged that the air-fuel ratio sensor is abnormal, the system controls the temperature of the air-fuel ratio sensor to the second temperature, and detects the output current of the air-fuel ratio sensor by the current detecting part when the internal combustion engine controls the air-fuel ratio so that the air-fuel ratio of the exhaust gas flowing around the air-fuel ratio sensor becomes a rich air-fuel ratio in the state where the temperature of the air-fuel ratio sensor is made the second temperature, and the system finally judges that the air-fuel ratio sensor has become abnormal when the output current when controlling the temperature of the air-fuel ratio sensor to the first temperature is larger than the output current when controlling the temperature of the air-fuel ratio sensor to the second temperature by a predetermined value or more.

(3) An abnormality diagnosis system of an air-fuel ratio sensor provided in an exhaust passage of an internal combustion engine and generating a limit current corresponding to an air-fuel ratio, comprising: a current detecting part detecting an output current of the air-fuel ratio sensor; and a sensor temperature control device controlling a temperature of the air-fuel ratio sensor, the system controls a temperature of the air-fuel ratio sensor to a first temperature by the sensor temperature control device and provisionally judges that the air-fuel ratio sensor is abnormal when the internal combustion engine controls the air-fuel ratio so that the air-fuel ratio of the exhaust gas flowing around the air-fuel ratio sensor becomes a rich air-fuel ratio richer than the stoichiometric air-fuel ratio in the state where the temperature of the air-fuel ratio sensor is made the first temperature, if the output current of the air-fuel ratio sensor detected by the current detecting part becomes a current value indicating an air-fuel ratio equal to or greater than a predetermined first lean air-fuel ratio leaner than the stoichiometric air-fuel ratio, the system controls the temperature of the air-fuel ratio sensor to a second temperature higher than the first temperature by the sensor temperature control device when it is provisionally judged that the air-fuel ratio sensor is abnormal, and detects the output current of the air-fuel ratio sensor by the current detecting part when the internal combustion engine controls the air-fuel ratio so that the air-fuel ratio of the exhaust gas flowing around the air-fuel ratio sensor becomes a rich air-fuel ratio in the state where the temperature of the air-fuel ratio sensor is made the second temperature, and the system finally judges that the air-fuel ratio sensor has become abnormal when the output current when controlling the temperature of the air-fuel ratio sensor to the second temperature becomes a current value indicating an air-fuel ratio equal to or greater than a second lean air-fuel ratio leaner than the first lean air-fuel ratio.

(4) The abnormality diagnosis system of an air-fuel ratio sensor according to above (3), wherein the system finally judges that the air-fuel ratio sensor is abnormal if the output current of the air-fuel ratio sensor becomes a current value indicating an air-fuel ratio equal to or greater than the second lean air-fuel ratio when the air-fuel ratio is controlled so that the air-fuel ratio of the exhaust gas flowing around the air-fuel ratio sensor becomes a rich air-fuel ratio in the state where the temperature of the air-fuel ratio sensor is made the first temperature.

(5) The abnormality diagnosis system of an air-fuel ratio sensor according to any one of above (1) to (4), wherein the internal combustion engine is provided with an exhaust purification catalyst in its exhaust passage and can control the air-fuel ratio so that the air-fuel ratio of the exhaust gas flowing into the exhaust purification catalyst becomes a target air-fuel ratio, and the system lowers a lower limit value of the target air-fuel ratio which can be set, when it is provisionally judged or finally judged that the air-fuel ratio sensor is abnormal.

(6) The abnormality diagnosis system of an air-fuel ratio sensor according to any one of above (1) to (5), wherein the internal combustion engine comprises an exhaust purification catalyst arranged in the exhaust passage, an upstream side air-fuel ratio sensor arranged upstream of the exhaust purification catalyst in the exhaust passage, and a downstream side air-fuel ratio sensor arranged at a downstream side, in the direction of exhaust flow, of the exhaust purification catalyst, and the downstream side air-fuel ratio sensor is the limit current type air-fuel ratio sensor.

(7) The abnormality diagnosis system of an air-fuel ratio sensor according to any one of above (1) to (5), wherein the internal combustion engine comprises an exhaust purification catalyst arranged in the exhaust passage, an upstream side air-fuel ratio sensor arranged upstream of the exhaust purification catalyst in the exhaust passage, and a downstream side air-fuel ratio sensor arranged at a downstream side, in the direction of exhaust flow, of the exhaust purification catalyst, and the upstream side air-fuel ratio sensor is the limit current type air-fuel ratio sensor.

(8) The abnormality diagnosis system of an air-fuel ratio sensor according to any one of above (1) to (7), wherein the internal combustion engine comprises an exhaust purification catalyst in the exhaust passage, controls the air-fuel ratio so that the air-fuel ratio of the exhaust gas flowing to the exhaust purification catalyst becomes the target air-fuel ratio, and can perform normal control alternately changing the target air-fuel ratio between the rich air-fuel ratio and a lean air-fuel ratio leaner than the stoichiometric air-fuel ratio; and active control making the target air-fuel ratio richer than the rich air-fuel ratio at the time of the normal control, and when the air-fuel ratio is controlled so that the air-fuel ratio of the exhaust gas flowing around the air-fuel ratio sensor becomes the rich air-fuel ratio, the active control is being executed.

(9) The abnormality diagnosis system of an air-fuel ratio sensor according to any one of above (1) to (7), wherein the internal combustion engine comprises an exhaust purification catalyst in the exhaust passage, controls the air-fuel ratio so that the air-fuel ratio of the exhaust gas flowing to the exhaust purification catalyst becomes the target air-fuel ratio, and can perform normal control alternately changing the target air-fuel ratio between the rich air-fuel ratio and a lean air-fuel ratio leaner than the stoichiometric air-fuel ratio, and the time when the air-fuel ratio is controlled so that the air-fuel ratio of the exhaust gas flowing around the air-fuel ratio sensor becomes a rich air-fuel ratio is the time when the target air-fuel ratio is made a rich air-fuel ratio during the normal control.

(10) The abnormality diagnosis system of an air-fuel ratio sensor according to any one of above (1) to (9), wherein the output current when controlling the temperature of the air-fuel ratio sensor used for judgment of abnormality of the air-fuel ratio sensor is an average value of the output current of the air-fuel ratio sensor when controlling the temperature of the air-fuel ratio sensor to the first temperature or the second temperature.

(11) The abnormality diagnosis system of an air-fuel ratio sensor according to above (3), wherein when the ratio of the time period where the output current of the air-fuel ratio sensor becomes a current value indicating an air-fuel ratio equal to or greater than the first lean air-fuel ratio with respect to the diagnosis period during which the air-fuel ratio is controlled so that the air-fuel ratio of the exhaust gas flowing around the air-fuel ratio sensor becomes the rich air-fuel ratio in the state where the temperature of the air-fuel ratio sensor is made the first temperature, becomes equal to or greater than a predetermined ratio, it is judged that an output current of the air-fuel ratio sensor has become a current value indicating an air-fuel ratio equal to or greater than the first lean air-fuel ratio, and when the ratio of the time period where the output current of the air-fuel ratio sensor becomes a current value indicating an air-fuel ratio equal to or greater than the second lean air-fuel ratio with respect to the diagnosis period during which the air-fuel ratio is controlled so that the air-fuel ratio of the exhaust gas flowing around the air-fuel ratio sensor becomes the rich air-fuel ratio in the state where the temperature of the air-fuel ratio sensor is made the second temperature, becomes equal to or greater than a predetermined ratio, it is judged that an output current of the air-fuel ratio sensor has become a current value indicating an air-fuel ratio equal to or greater than the second lean air-fuel ratio.

Advantageous Effects of Invention

According to the present invention, it is possible to reliably detect a crack of element of an air-fuel ratio sensor.

DESCRIPTION OF EMBODIMENTS

Figure 1:
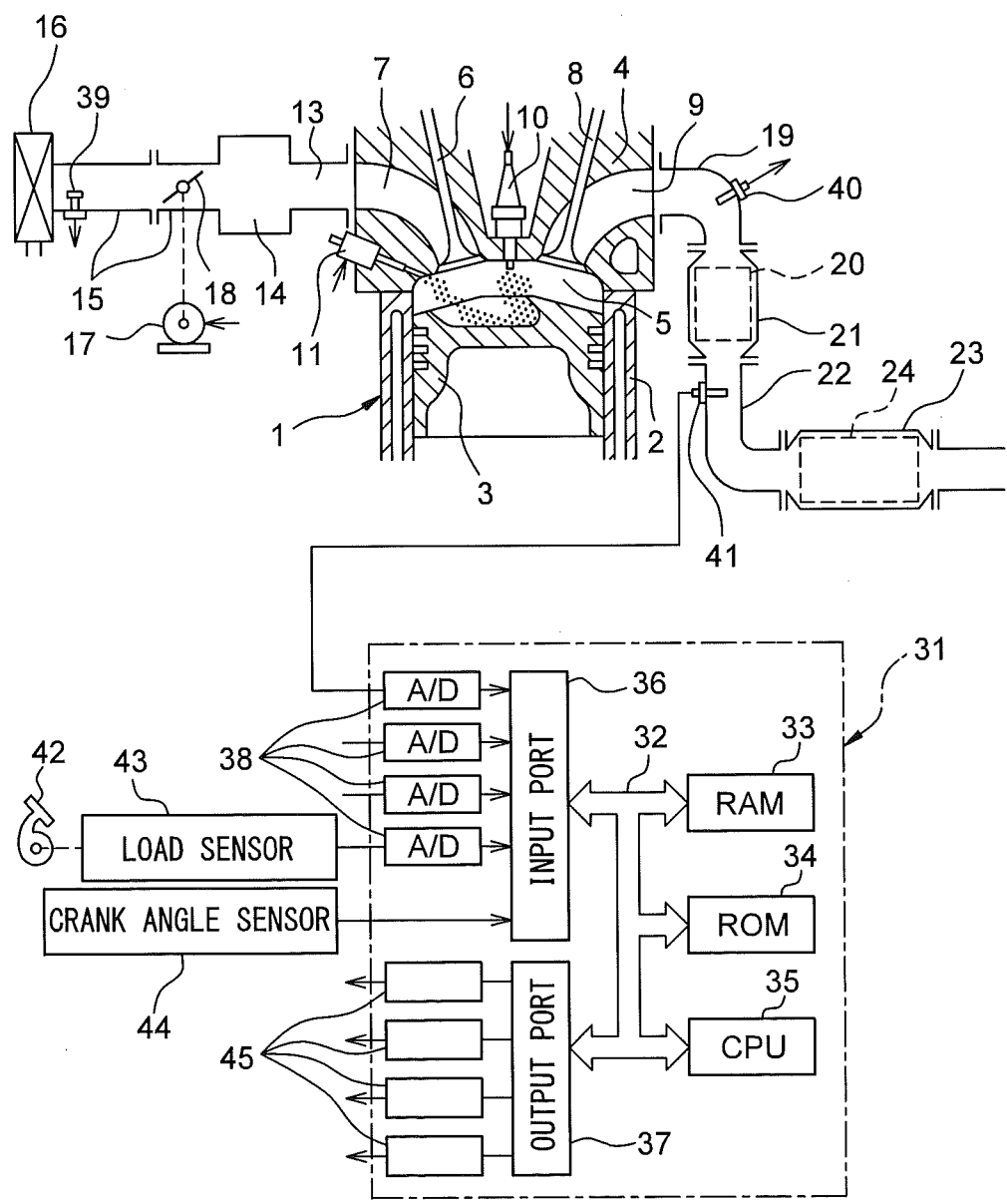
FIG. 1 is a view schematically showing an internal combustion engine in which an abnormality diagnosis system of the present invention is used.

Below, referring to the drawings, an embodiment of the present invention will be explained in detail. Note that, in the following explanation, similar component elements are assigned the same reference numerals <Explanation of Internal Combustion Engine as a Whole>

FIG. 1 is a view which schematically shows an internal combustion engine in which an abnormality diagnosis system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the abnormality diagnosis system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as abnormality diagnosis system for diagnosing abnormality of the internal combustion engine (in particular, the upstream side exhaust purification catalyst 20 and the downstream side exhaust purification catalyst 24).

The upstream side exhaust purification catalyst 20 and the downstream side exhaust purification catalyst 24 are three-way catalysts which has an oxygen storage ability. Specifically, the upstream side exhaust purification catalyst 20 and the downstream side exhaust purification catalyst 24 are formed from three-way catalysts which comprises a carrier made of ceramic on which a precious metal (for example, platinum Pt) having catalytic action and a substance which has an oxygen storage ability (for example, ceria $CeO_2$) are carried. A three-way catalyst has the function of simultaneously purifying unburned HC, CO and $NO_x$ when the air-fuel ratio of the exhaust gas flowing into the three-way catalyst is maintained at the stoichiometric air-fuel ratio. In addition, when the exhaust purification catalysts 20 and 24 have an oxygen storage ability, the unburned HC and CO and $NO_x$ are simultaneously purified even if the air-fuel ratio of the exhaust gas flowing into the exhaust purification catalysts 20 and 24 somewhat deviates from the stoichiometric air-fuel ratio to the rich side or lean side.

That is, if the exhaust purification catalysts 20 and 24 have an oxygen storage ability, when the air-fuel ratio of the exhaust gas flowing into the exhaust purification catalysts 20, 24 becomes somewhat lean with respect to the stoichiometric air-fuel ratio, the excess oxygen contained in the exhaust gas is stored in the exhaust purification catalysts 20, 24 and thus the surfaces of the exhaust purification catalysts 20 and 24 are maintained at the stoichiometric air-fuel ratio. As a result, on the surfaces of the exhaust purification catalysts 20 and 24, the unburned HC, CO and $NO_x$ are simultaneously purified. At this time, the air-fuel ratio of the exhaust gas flowing out from the exhaust purification catalysts 20 and 24 becomes the stoichiometric air-fuel ratio.

On the other hand, when the air-fuel ratio of the exhaust gas flowing into the exhaust purification catalysts 20, 24 becomes somewhat rich with respect to the stoichiometric air-fuel ratio, the oxygen, which is insufficient for reducing the unburned HC and CO which are contained in the exhaust gas, is released from the exhaust purification catalysts 20 and 24. In this case as well, the surfaces of the exhaust purification catalysts 20 and 24 are maintained at the stoichiometric air-fuel ratio. As a result, at the surfaces of the exhaust purification catalysts 20 and 24, unburned HC, CO and $NO_x$ are simultaneously purified. At this time, the air-fuel ratio of the exhaust gas flowing out from the exhaust purification catalysts 20 and 24 becomes the stoichiometric air-fuel ratio.

In this way, when the exhaust purification catalysts 20 and 24 have an oxygen storage ability, even if the air-fuel ratio of the exhaust gas flowing into the exhaust purification catalysts 20 and 24 deviates somewhat from the stoichiometric air-fuel ratio to the rich side or lean side, the unburned HC, CO and $NO_x$ are simultaneously purified and the air-fuel ratio of the exhaust gas flowing out from the exhaust purification catalysts 20 and 24 becomes the stoichiometric air-fuel ratio.

<Explanation of Air-Fuel Ratio Sensor>

Figure 2:
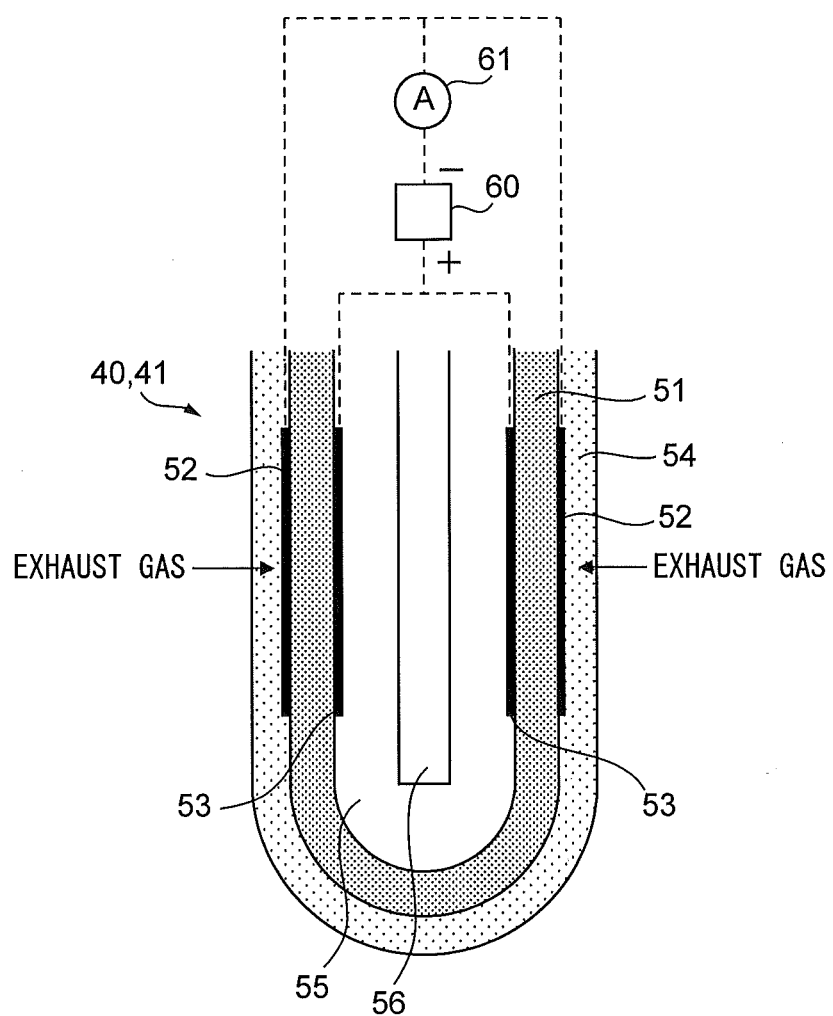
FIG. 2 is a schematic cross-sectional view of an air-fuel ratio sensor.

In the present embodiment, as the air-fuel ratio sensors 40 and 41, cup type limit current type air-fuel ratio sensors are used. FIG. 2 will be used to simply explain the structures of the air-fuel ratio sensors 40 and 41. Each of the air-fuel ratio sensors 40 and 41 is provided with a solid electrolyte layer 51, an exhaust side electrode 52 which is arranged on one side surface of the same, an atmosphere side electrode 53 which is arranged on the other side surface, a diffusion regulation layer 54 which regulates the diffusion of the flowing exhaust gas, a reference gas chamber 55, and a heater part 56 which heats the air-fuel ratio sensor 40 or 41, in particular, heats the solid electrolyte layer 51. The heater part 56, together with the ECU 31 connected to the heater part 56, functions as a sensor temperature control device for controlling the temperature of the air-fuel ratio sensors 40 and 41, in particular, the solid electrolyte layer 51 of the air-fuel ratio sensors 40 and 41.

In particular, in each of the cup type air-fuel ratio sensors 40 and 41 of the present embodiment, the solid electrolyte layer 51 is formed into a cylindrical shape with one closed end. Inside of the reference gas chamber 55 which is defined inside of the solid electrolyte layer 51, atmospheric gas (air) is introduced and the heater part 56 is arranged. On the inside surface of the solid electrolyte layer 51, an atmosphere side electrode 53 is arranged. On the outside surface of the solid electrolyte layer 51, an exhaust side electrode 52 is arranged. On the outside surfaces of the solid electrolyte layer 51 and the exhaust side electrode 52, a diffusion regulation layer 54 is arranged to cover the same. Note that, at the outside of the diffusion regulation layer 54, a protective layer (not shown) may be provided for preventing a liquid, etc., from depositing on the surface of the diffusion regulation layer 54.

The solid electrolyte layer 51 is formed by a sintered body of $ZrO_2$ (zirconia), $HfO_2$, $ThO_2$, $Bi_2O_2$, or other oxygen ion conducting oxide in which CaO, MgO, $Y_2O_2$, $Yb_2O_2$, etc., is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage V is supplied by the voltage control device 60 which is mounted on the ECU 31. In addition, the ECU 31 is provided with a current detection part 61 which detects the current which flows between these electrodes 52 and 53 through the solid electrolyte layer 51 when the voltage supply device 60 supplies the sensor voltage by the voltage control device 60. The current which is detected by this current detection part 61 is the output current I of the air-fuel ratio sensors 40 and 41.

Figure 3:
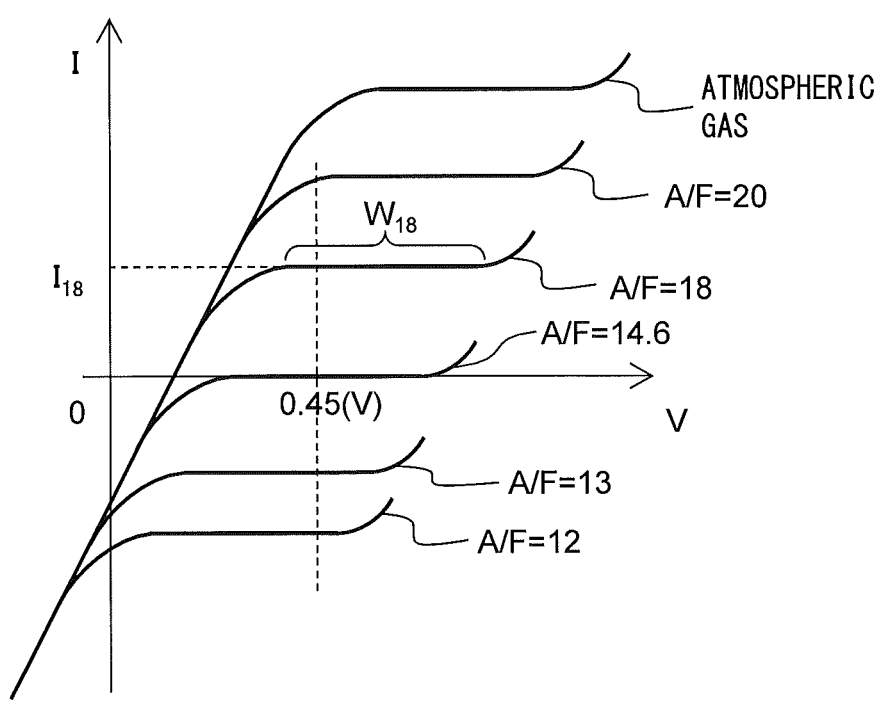
FIG. 3 is a view showing a relationship between an applied voltage V and an output current I at different exhaust air-fuel ratios A/F.

The thus configured air-fuel ratio sensors 40 and 41 have the voltage-current (V-I) characteristic such as shown in FIG. 3. As will be understood from FIG. 3, the higher (the leaner) the air-fuel ratio of the exhaust gas, i.e., the exhaust air-fuel ratio A/F, the output current I of the air-fuel ratio sensors 40 and 41 becomes larger. Further, at the line V-I of each exhaust air-fuel ratio A/F, there is a region parallel to the V axis, that is, a region where the output current I does not change much at all even if the sensor applied voltage V changes. This voltage region is called the "limit current region". The current at this time is called the "limit current". In FIG. 3, the limit current region and limit current when the exhaust air-fuel ratio is 18 are shown by $W_{18}$ and $I_{18}$.

Figure 4:
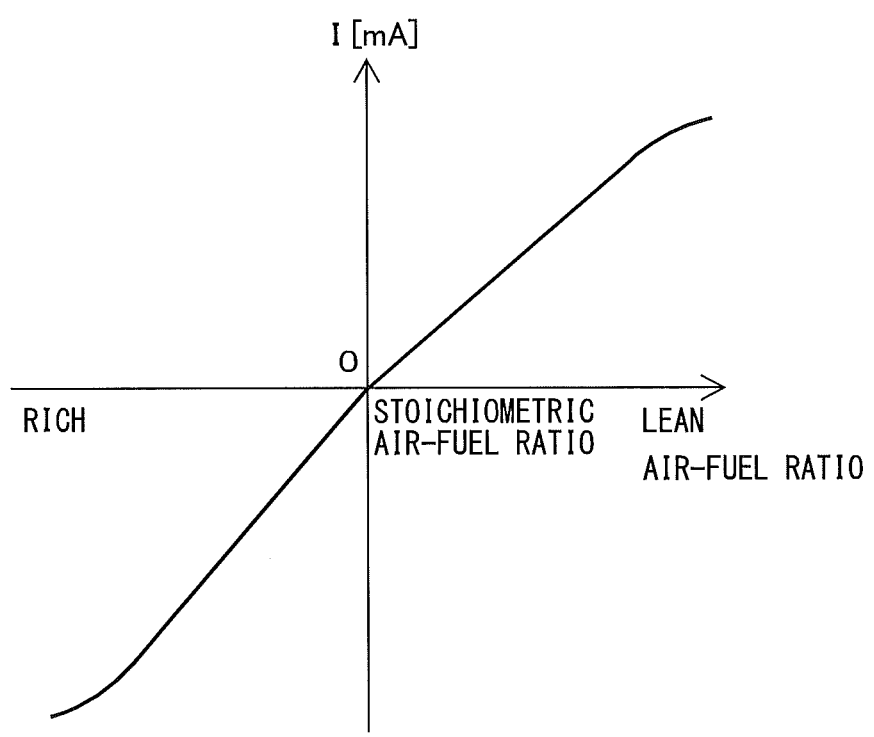
FIG. 4 is a view showing a relationship between an air-fuel ratio and an output current I when making an applied voltage V constant.

FIG. 4 shows the relationship between the exhaust air-fuel ratio and the output current I when making the applied voltage V constant at about 0.45V (FIG. 3). As will be understood from FIG. 4, in the air-fuel ratio sensors 40 and 41, the output current changes linearly (proportionally) changes with respect to the exhaust air-fuel ratio so that the higher (that is, the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio.

Note that, as the air-fuel ratio sensors 40 and 41, instead of the limit current type air-fuel ratio sensor having the structure shown in FIG. 2, it is also possible to use a layered-type limit current type air-fuel ratio sensor.

<Basic Control>

In the internal combustion engine which is configured in this way, the outputs of the upstream side air-fuel ratio sensor 40 and the downstream side air-fuel ratio sensor 41 are used as the basis to set the fuel injection amount from the fuel injector 11 so that the air-fuel ratio of the exhaust gas which flows into the upstream side exhaust purification catalyst 20 becomes the optimum air-fuel ratio based on the engine operating state. As a method of setting such a fuel injection amount, the method of feedback-controlling, based on the output of the upstream side air-fuel ratio sensor 40, the air-fuel ratio of the exhaust gas which flows into the upstream side exhaust purification catalyst 20 (or the target air-fuel ratio of the exhaust gas which flows out from the engine body) to become the target air-fuel ratio, and correcting the output of the upstream side air-fuel ratio sensor 40 or changing the target air-fuel ratio, based on the output of the upstream side air-fuel ratio sensor 40.

Figure 5:
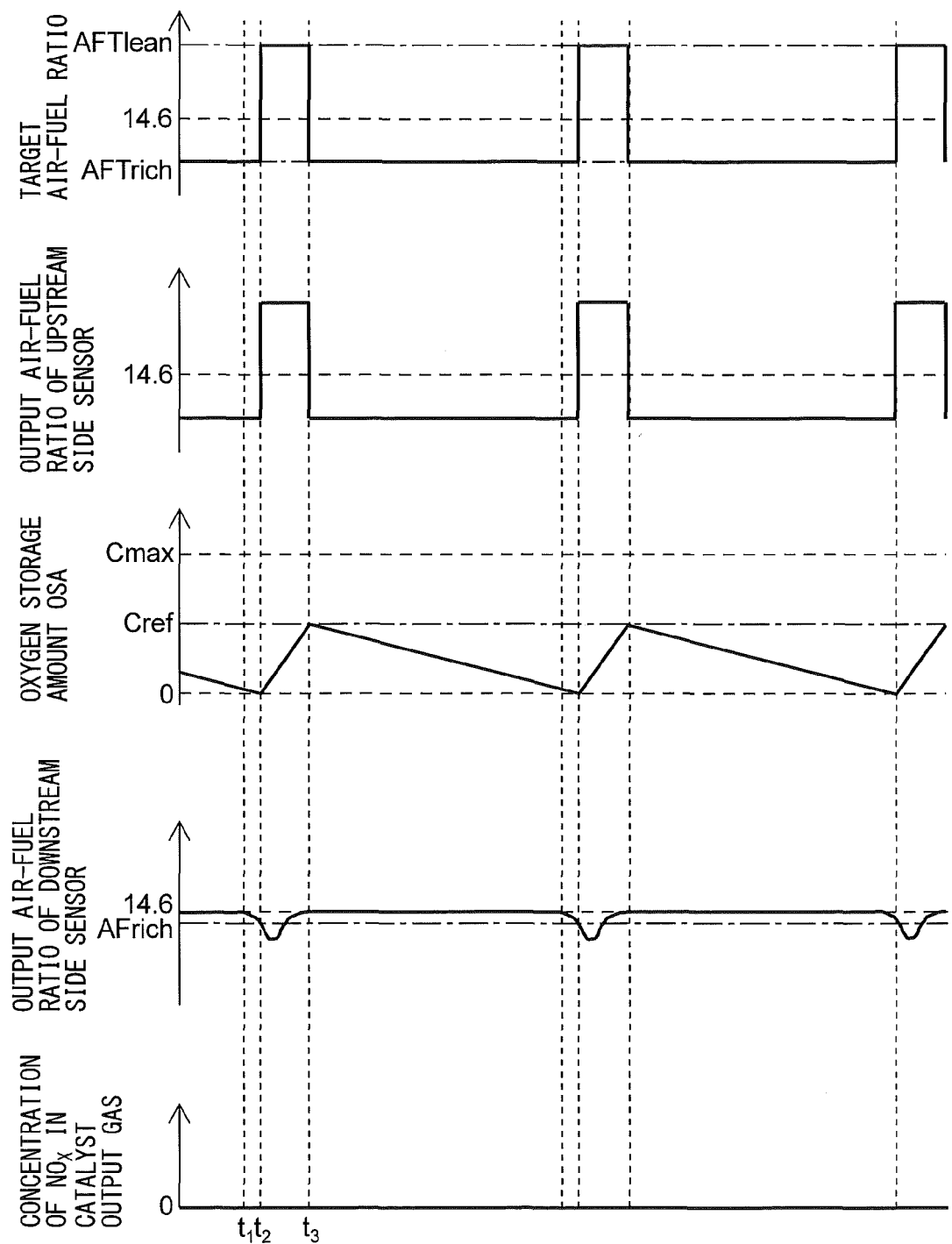
FIG. 5 is a time chart showing a change of an oxygen storage amount of an upstream side exhaust purification catalyst, etc., at the time of normal operation of an internal combustion engine.

Referring to FIG. 5, an example of such control of the target air-fuel ratio will be simply explained. FIG. 5 is a time chart of factors at the time of normal operation of the internal combustion engine such as the stored amount of oxygen of the upstream side exhaust purification catalyst, target air-fuel ratio, output air-fuel ratio of the upstream side air-fuel ratio sensor, and output air-fuel ratio of the downstream side air-fuel ratio sensor. Note that, "output air-fuel ratio" means an air-fuel ratio which corresponds to output of an air-fuel ratio sensor. Further, "at the time of normal operation" means the operating state (control state) when not performing control to adjust the fuel injection amount in accordance with a specific operating state of the internal combustion engine (for example, correction to increase fuel injection amount which is performed at the time of acceleration of the vehicle which mounts the internal combustion, fuel cut control in which fuel feed to the combustion chamber is stopped, etc.)

In the example which is shown in FIG. 5, when the output air-fuel ratio of the downstream side air-fuel ratio sensor 41 becomes the rich judgment reference air-fuel ratio (for example, 14.55) or less, the target air-fuel ratio is set to and maintained at the lean set air-fuel ratio AFTlean (for example, 15). After this, if the stored amount of oxygen of the upstream side exhaust purification catalyst 20 is estimated and this estimated value becomes a predetermined judgment reference stored amount Cref (amount smaller than maximum stored amount of oxygen Cmax) or more, the target air-fuel ratio is set to the rich set air-fuel ratio AFTrich (for example, 14.4) and maintained there. In the example which is shown in FIG. 5, such an operation is repeated.

Specifically, in the example which is shown in FIG. 5, before the time $t_1$, the target air-fuel ratio is made the rich set air-fuel ratio AFTrich. Along with this, the output air-fuel ratio of the upstream side air-fuel ratio sensor 40 also becomes an air-fuel ratio richer than the stoichiometric air-fuel ratio (hereinafter, referred to as "rich air-fuel ratio"). Further, the upstream side exhaust purification catalyst 20 stores oxygen, so the output air-fuel ratio of the downstream side air-fuel ratio sensor 41 becomes a substantially stoichiometric air-fuel ratio (14.6). At this time, the air-fuel ratio of the exhaust gas which flows into the upstream side exhaust purification catalyst 20 becomes a rich air-fuel ratio, so the upstream side exhaust purification catalyst 20 gradually falls in stored amount of oxygen.

After this, at the time $t_1$, the upstream side exhaust purification catalyst 20 approaches zero in stored amount of oxygen whereby part of the unburned gas (unburned HC, CO) which flows into the upstream side exhaust purification catalyst 20 starts to flow out without being purified by the upstream side exhaust purification catalyst 20. As a result, at the time $t_2$, the output air-fuel ratio of the downstream side air-fuel ratio sensor 41 becomes a rich judgment air-fuel ratio AFrich which is slightly richer than the stoichiometric air-fuel ratio. At this time, the target air-fuel ratio is switched from the rich set air-fuel ratio AFTrich to the lean set air-fuel ratio AFTlean.

By switching of the target air-fuel ratio, the air-fuel ratio of the exhaust gas which flows into the upstream side exhaust purification catalyst 20 becomes an air-fuel ratio leaner than the stoichiometric air-fuel ratio (hereinafter, referred to as "lean air-fuel ratio") and the outflow of unburned gas is reduced and stops. Further, the upstream side exhaust purification catalyst 20 gradually increases in stored amount of oxygen. At the time $t_3$, it reaches the judgment reference stored amount Cref. In this way, if the stored amount of oxygen reaches the judgment reference stored amount Cref, the target air-fuel ratio is again switched from the lean set air-fuel ratio AFlena to the rich set air-fuel ratio AFTrich. By switching of this target air-fuel ratio, the air-fuel ratio of the exhaust gas which flows into the upstream side exhaust purification catalyst 20 again becomes the rich air-fuel ratio. As a result, the upstream side exhaust purification catalyst 20 gradually falls in stored amount of oxygen. After this, this operation is repeated. By performing such control, $NO_x$ can be prevented from flowing out from the upstream side exhaust purification catalyst 20.

Note that, control of the target air-fuel ratio based on the outputs of the upstream side air-fuel ratio sensor 40 and downstream side air-fuel ratio sensor 41 which is performed as normal control is not limited to the above-explained control. If control based on the outputs of these air-fuel ratio sensors 40 and 41, any type of control is possible. Therefore, for example, as normal control, it is also possible to fix the target air-fuel ratio at the stoichiometric air-fuel ratio and perform feedback control so that the output air-fuel ratio of the upstream side air-fuel ratio sensor 40 becomes the stoichiometric air-fuel ratio and to perform control to use the output air-fuel ratio of the downstream side air-fuel ratio sensor 41 as the basis to correct the output air-fuel ratio of the upstream side air-fuel ratio sensor 40.

<Crack of Element of Air-Fuel Ratio Sensor>

Figure 6:
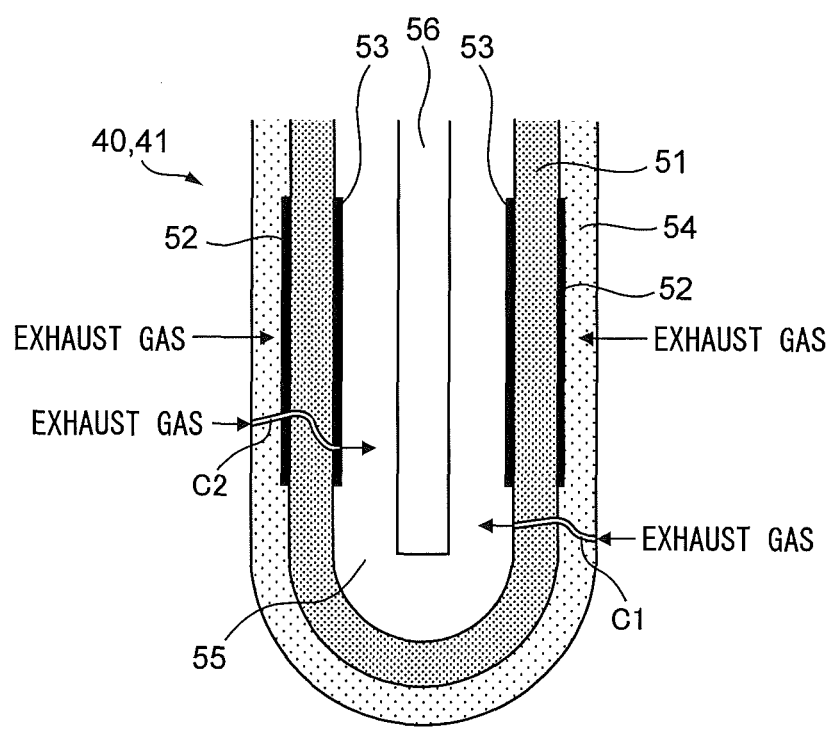
FIG. 6 is a schematic cross-sectional view of an air-fuel ratio sensor having a crack of element.

In this regard, as an abnormality state which occurs as the above-mentioned air-fuel ratio sensors 40 and 41, the phenomenon of the element forming the air-fuel ratio sensor 40 or 41 cracking, that is, a crack of element, may be mentioned. Specifically, a crack may occur passing through the solid electrolyte layer 51 and diffusion regulation layer 54 (FIG. 6, C1) or a crack may occur passing through the solid electrolyte layer 51 and diffusion regulation layer 54 and also the two electrodes 52 and 53 (FIG. 6, C2). If such a crack of element occurs, as shown in FIG. 6, exhaust gas enters inside of the reference gas chamber 55 through the cracked part. In this case, if a large amount of exhaust gas enters the reference gas chamber 55, even if the air-fuel ratio of the exhaust gas is a rich air-fuel ratio, the output air-fuel ratio of the air-fuel ratio sensor 40 or 41 will be a lean air-fuel ratio. Next, this will be explained with reference to FIG. 7.

Figure 7:
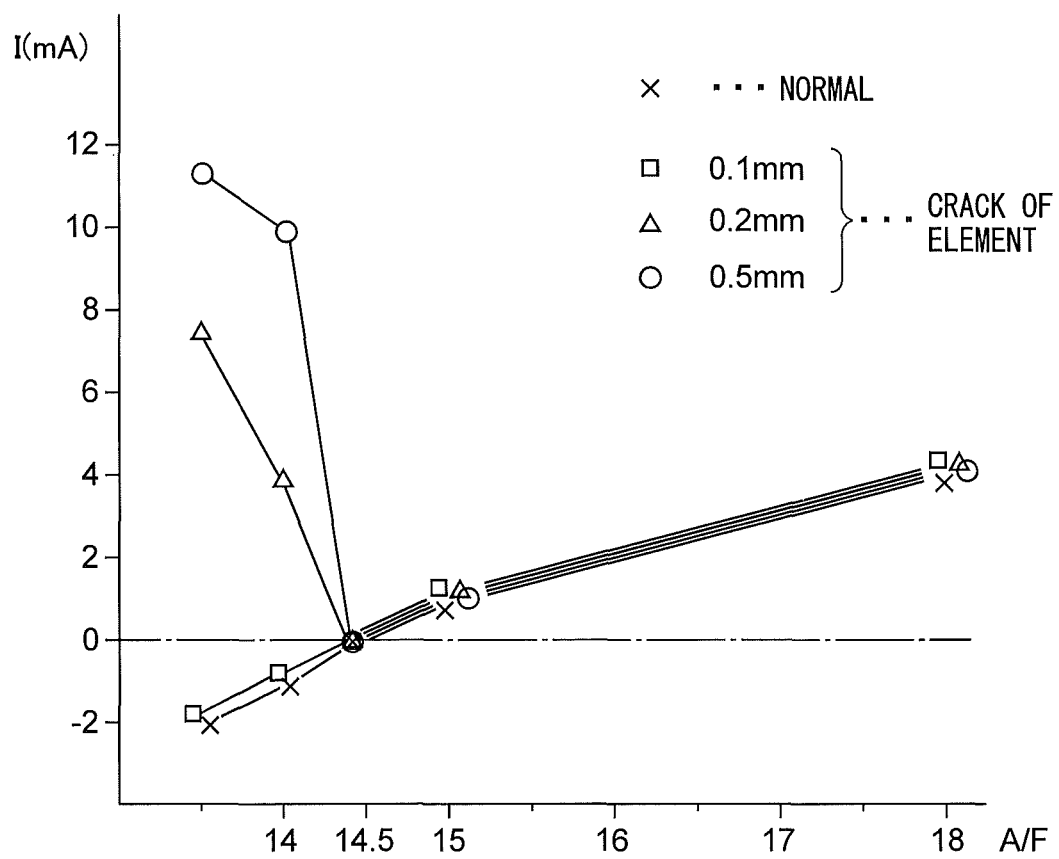
FIG. 7 is a view showing a relationship between an output current I and an air-fuel ratio A/F when an air-fuel ratio sensor has a crack of element.

FIG. 7 shows the relationship, similar to FIG. 4, between the exhaust air-fuel ratio A/F and the output current I of an air-fuel ratio sensor 40 or 41 when making the applied voltage constant at 0.45V or so. Note that, this FIG. 7 shows the results of experiments when forming a through hole, in an air-fuel ratio sensor 40 or 41, passing through the solid electrolyte layer 51 and diffusion regulation layer 54 so as to artificially create the state having a crack of element. In this FIG. 7, the x marks indicate the case where the air-fuel ratio sensor 40 or 41 is normal, while the □ marks, Δ marks, and ○ marks indicate the cases where through holes are formed in the air-fuel ratio sensor 40 or 41. Note that, the □ marks show the case of forming a through hole of a diameter of 0.1 mm, the Δ marks show the case of forming a through hole of a diameter of 0.2 mm, and the ○ marks show the case of forming a through hole of a diameter of 0.5 mm.

As shown in FIG. 7, when the diameter of the through hole is 0.1 mm (□ marks), in the same way as the case where the air-fuel ratio sensor 40 or 41 is normal (x marks), the output current I of the air-fuel ratio sensor 40 or 41 increases as the exhaust air-fuel ratio A/F becomes larger, that is, as the exhaust air-fuel ratio A/F becomes leaner. In this case, the output current I of the air-fuel ratio sensor 40 or 41 changes with respect to the exhaust air-fuel ratio A/F in the same way as FIG. 4. On the other hand, when the diameter of the through hole is 0.2 mm (Δ marks) and the diameter of the through hole is 0.5 mm (○ marks), when the exhaust air-fuel ratio A/F is equal to or greater than 14.6 and thus a lean air-fuel ratio, in the same way as when the diameter of the through hole is 0.1 mm (□ marks) and the air-fuel ratio sensor 40 or 41 is normal (x marks), the output current I of the air-fuel ratio sensor 40 or 41 increases as the exhaust air-fuel ratio A/F becomes larger, that is, as the exhaust air-fuel ratio A/F becomes lean. As opposed to this, when the exhaust air-fuel ratio A/F is equal to or less than 14.6 and thus a rich air-fuel ratio, the output current I of the air-fuel ratio sensor 40 or 41 greatly increases as the exhaust air-fuel ratio A/F becomes smaller, that is, as the exhaust air-fuel ratio A/F becomes richer.

As will be understood from the results of experiments, if the diameter of the through hole become larger, the exhaust gas entering from the through hole to the air-fuel ratio sensor 40 or 41 has a great effect on the output current I of the air-fuel ratio sensor 40 or 41. Even if the exhaust air-fuel ratio A/F is a rich air-fuel ratio, the output current I of the air-fuel ratio sensor 40 or 41 becomes a positive current value. That is, even if the actual exhaust air-fuel ratio A/F is the rich air-fuel ratio, the output air-fuel ratio of the air-fuel ratio sensor 40 or 41 is a lean air-fuel ratio. Therefore, from the results of experimental shown in FIG. 7, when the actual exhaust air-fuel ratio A/F is a rich air-fuel ratio, if the output air-fuel ratio of the air-fuel ratio sensor 40 or 41 is a lean air-fuel ratio, it can be judged that a crack of element having a great effect on the output air-fuel ratio of an air-fuel ratio sensor 40 or 41 has occurred.

Figure 8A:
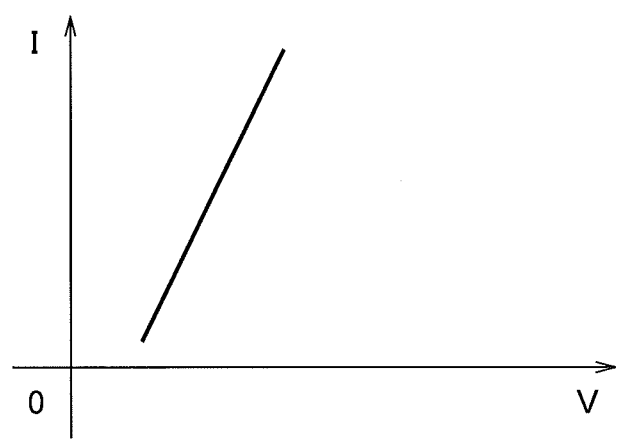
FIGS. 8A and 8B are views showing a relationship between an output current I and an applied voltage V when an air-fuel ratio sensor has a crack of element.
Figure 8B:
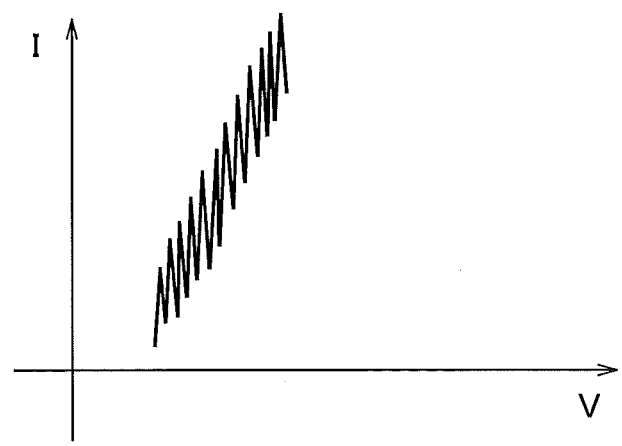

On the other hand, the solid line of FIG. 8A shows the relationship between the output current I of the air-fuel ratio sensor 40 or 41 and the applied voltage to the air-fuel ratio sensor 40 or 41 in the case where there is a crack of element having a great effect on the output air-fuel ratio of an air-fuel ratio sensor 40 or 41 and when the exhaust air-fuel ratio A/F is a rich air-fuel ratio. When the air-fuel ratio sensor 40 or 41 is normal, when the exhaust air-fuel ratio A/F is the rich air-fuel ratio, as will be understood from FIG. 3, the output current I of the air-fuel ratio sensors 40 or 41 becomes a negative current value. However, if a crack of element having a great effect on the output air-fuel ratio of an air-fuel ratio sensor 40 or 41 occurs, as will be understood from the solid line of FIG. 8A, when the exhaust air-fuel ratio A/F is a rich air-fuel ratio, the output current I of the air-fuel ratio sensor 40 or 41 becomes a positive current value. Further, if, at this time, making the applied voltage V to the air-fuel ratio sensor 40 or 41 increase, the output current I of the air-fuel ratio sensor 40 or 41 increases. FIG. 8B shows the actual change of the output current I of the air-fuel ratio sensor 40 or 41 at this time. That is, the exhaust pressure in the exhaust passage vibrates. Therefore, the exhaust gas passes through the part of the crack of element to enter into and leave the inside of the air-fuel ratio sensor 40 or 41, and therefore the output current I of the air-fuel ratio sensor 40 or 41 constantly fluctuates as shown in FIG. 8B.

Next, referring to FIG. 9A to FIG. 11C, the reason why, in the case where a crack of element having a great effect on the output air-fuel ratio of an air-fuel ratio sensor 40 or 41 occurs, if the exhaust air-fuel ratio A/F is a rich air-fuel ratio, as shown in FIG. 7 and FIG. 8A, the output current I of the air-fuel ratio sensor 40 or 41 becomes a positive current value, and, if, as shown in FIG. 8A, increasing the applied voltage V to the air-fuel ratio sensor 40 or 41, the output current I of the air-fuel ratio sensor 40 or 41 increases, will be simply explained.

Figure 9A:
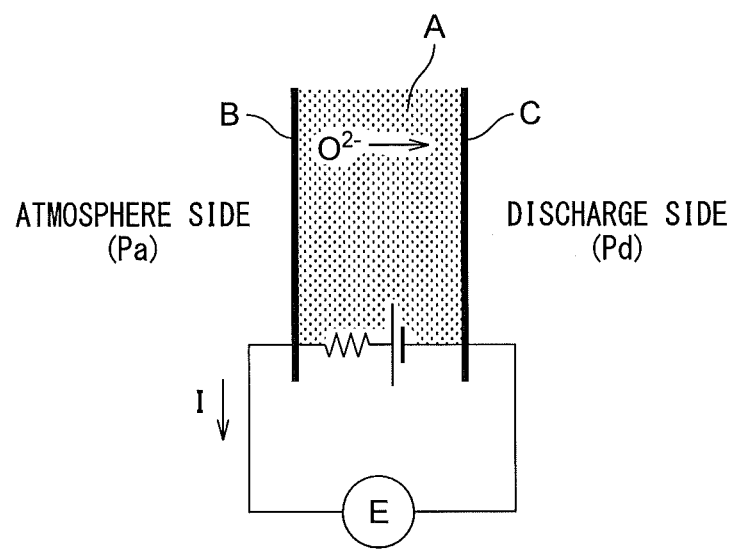
FIGS. 9A and 9B are a schematic cross-sectional view of an oxygen concentration sensor and a view showing a change of an output voltage of an oxygen concentration sensor.

FIG. 9A is an explanatory view of the principle of operation of an oxygen concentration sensor not having a diffusion regulation layer. In FIG. 9A, A shows a solid electrolyte layer, B shows an atmosphere side electrode, and C shows an exhaust side electrode. This oxygen concentration sensor generates an electromotive force E by the following formula based on the difference between the atmosphere side oxygen partial pressure Pa and the exhaust side oxygen partial pressure Pd:

$$E=(RT/4F)\ln(Pa/Pd)$$

Note that, R is a gas constant, T is the absolute temperature of the solid electrolyte layer A, and F is Faraday's constant.

Figure 9B:
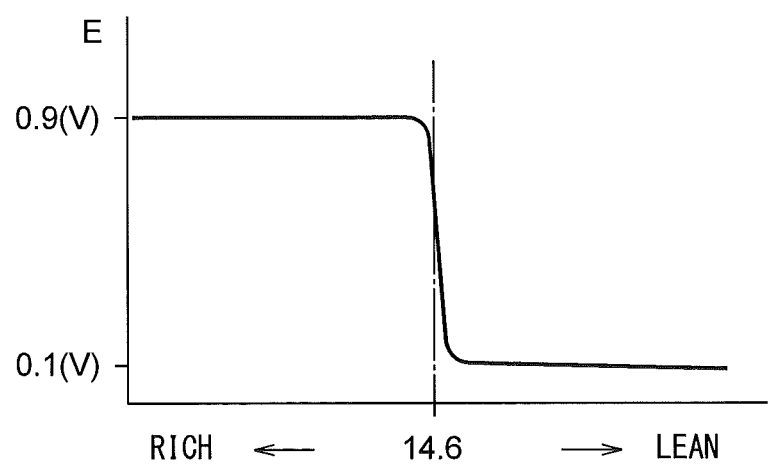

When the air-fuel ratio A/F of the exhaust gas is a lean air-fuel ratio, the atmosphere side oxygen partial pressure Pa is higher than the exhaust side oxygen partial pressure Pd, and therefore the oxygen in the atmosphere receives electrons at the atmosphere side electrode B and, as shown in FIG. 9A, becomes oxygen ions which move through the inside of the solid electrolyte layer A to the exhaust side electrode C. As a result, an electromotive force E is generated between the atmosphere side electrode B and the exhaust side electrode C. At this time, the ratio of the atmosphere side oxygen partial pressure Pa and the exhaust side oxygen partial pressure Pd is not that large. Therefore, as shown in FIG. 9B, the electromotive force E when the air-fuel ratio A/F of the exhaust gas is lean becomes 0.1V or so.

As opposed to this, if the air-fuel ratio A/F of the exhaust gas becomes a rich air-fuel ratio, the exhaust side electrode C becomes an oxygen deficient state. At this time, the oxygen ions reaching the exhaust side electrode C react with the unburned HC and CO and are immediately consumed. Therefore, at this time, the oxygen ions successively move through the inside of the solid electrolyte layer A to the exhaust side electrode C. At this time, the ratio of the atmosphere side oxygen partial pressure Pa and the exhaust side oxygen partial pressure Pd becomes extremely large, and therefore as shown in FIG. 9B, if the air-fuel ratio A/F of the exhaust gas becomes the rich air-fuel ratio, the electromotive force E rapidly rises to 0.9V or so. So long as the air-fuel ratio A/F of the exhaust gas is a rich air-fuel ratio, the electromotive force E is maintained at 0.9V or so.

Figure 10A:
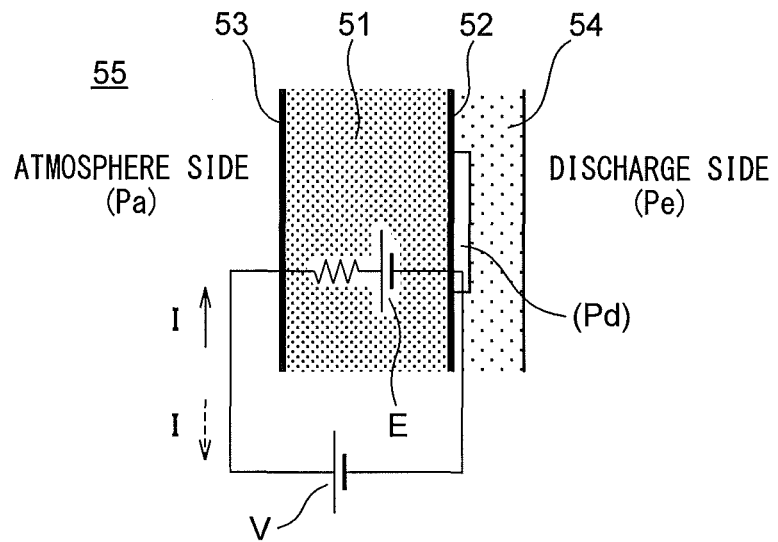
FIGS. 10A and 10B are a schematic cross-sectional view of an air-fuel ratio sensor and a view showing a change in an output current I of an air-fuel ratio sensor.
Figure 10B:
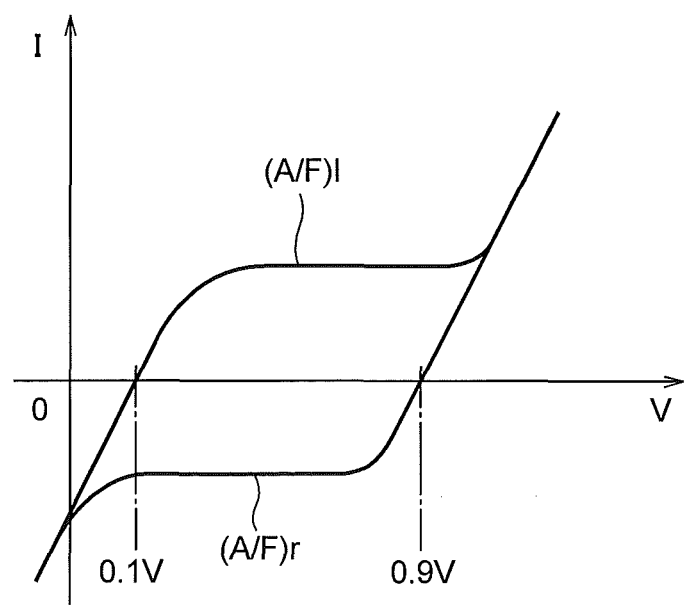

FIG. 10A is an explanatory view of the principle of operation of the air-fuel ratio sensors 40, 41 which are used in the present embodiment. Note that, at FIG. 10A, 51 shows a solid electrolyte layer, 52 an exhaust side electrode, 53 an atmosphere side electrode, and 54 a diffusion regulation layer. On the other hand, FIG. 10B shows the relationship between an output current I of an air-fuel ratio sensor 40 or 41 and an applied voltage V for a certain lean air-fuel ratio (A/F)l, and the relationship between an output current I of an air-fuel ratio sensor 40 or 41 and an applied voltage V for a certain rich air-fuel ratio (A/F)r. In this regard, in these air-fuel ratio sensors 40, 41 as well, an electromotive force E is generated between the atmosphere side electrode 53 and the exhaust side electrode 52. Furthermore, in these air-fuel ratio sensors 40, 41, an applied voltage V is applied in the opposite direction to this electromotive force E between the atmosphere side electrode 53 and the exhaust side electrode 52. If an applied voltage V is applied between the atmosphere side electrode 53 and the exhaust side electrode 52, at the surface of the exhaust side electrode 52, the oxygen is converted to oxygen ions and the oxygen ions are sent in from the exhaust side electrode 52 to the atmosphere side electrode 53 as a pumping action. As a result, the air-fuel ratio sensors 40, 41 generate the output current I.

In this regard, when the air-fuel ratio A/F of the exhaust gas is a lean air-fuel ratio, the oxygen in the exhaust gas passes through the diffusion regulation layer 54 and reaches the surface of the exhaust side electrode 52. At this time, the ratio of the atmosphere side oxygen partial pressure Pa and the exhaust side oxygen partial pressure Pd is not that large. Therefore, at this time, an electromotive force E of 0.1V or so is generated. If raising the applied voltage V in such a state, due to the pumping action of oxygen ions, a positive output current I shown in FIG. 10A by the solid line arrow is generated. On the other hand, the amount of oxygen which diffuses through the inside of the diffusion regulation layer 54 and reaches the surface of the exhaust side electrode 52 is proportional to the difference between the oxygen partial pressure Pe in the exhaust gas and the oxygen partial pressure Pd at the surface of the exhaust side electrode 52. On the surface of the exhaust side electrode 52, only an amount of oxygen which corresponds to the difference between the oxygen partial pressure Pe in the exhaust gas and the oxygen partial pressure Pd on the surface of the exhaust side electrode 52, is fed. Therefore, even if the applied voltage V is increased, the amount of oxygen fed to the surface of the exhaust side electrode 52 is regulated, and therefore the amount of oxygen ions sent in by the pumping action is restricted to a constant amount. Therefore as shown in FIG. 10B by (A/F)l, the output current I is maintained constant even if the applied voltage V changes, that is, a limit current is generated.

As opposed to this, if the air-fuel ratio A/F of the exhaust gas becomes a rich air-fuel ratio, the unburned gas passes through the diffusion regulation layer 54 and reaches the surface of the exhaust side electrode 52. At this time, the oxygen ions reaching the exhaust side electrode 52 react with the unburned gas and are immediately consumed, therefore the exhaust side electrode 52 becomes an oxygen deficient state. Therefore, the ratio of the atmosphere side oxygen partial pressure Pa and the exhaust side oxygen partial pressure Pd becomes extremely large, and therefore between the electrodes 52, 53, a large electromotive force E of 0.9V or so is generated. Therefore, oxygen ions successively move in the solid electrolyte layer 51 to the exhaust side electrode 52. At this time, a negative output current I shown by the broken line arrow in FIG. 10A is generated. However, in this case as well, the amount of unburned gas diffusing inside the diffusion regulation layer 54 and reaching the surface of the exhaust side electrode 52 is proportional to the difference between the partial pressure Pe in the exhaust gas and the partial pressure Pd of the unburned gas on the surface of the exhaust side electrode 52. Accordingly, on the surface of the exhaust side electrode 52, only an amount of unburned gas corresponding to the difference between the partial pressure Pe of unburned gas in the exhaust gas and the partial pressure Pd of unburned gas on the surface of the exhaust side electrode 52, is fed. That is, the amount of unburned gas fed to the surface of the exhaust side electrode 52 is regulated by the diffusion regulation layer 54.

In this regard, if applying an applied voltage V 0.9V or so in this way when an electromotive force E of 0.9V or so is being generated, the electromotive force E and the applied voltage V are opposite polarities, and therefore as will be understood from the solid line (A/F)r of FIG. 10B, the output current I of the air-fuel ratio sensor 40 or 41 is zero. If making the applied voltage V fall from this state, oxygen ions will start to move toward the exhaust side electrode 52. However, at this time, as explained above, the amount of unburned gas fed to the surface of the exhaust side electrode 52 is regulated by the diffusion regulation layer 54. Therefore, even if making the applied voltage V fall, the amount of oxygen ions reaching the exhaust side electrode 52 is restricted to a constant amount. Therefore, as shown in FIG. 10B by (A/F)r, the output current I is maintained constant even if the applied voltage V changes, that is, limit current is generated. On the other hand, when an electromotive force E of 0.9V or so is generated in this way, no oxygen is present on the surface of the exhaust side electrode 52. Therefore, at this time, even if applying an applied voltage higher than 0.9V, oxygen ions will not move toward the atmosphere side electrode 53. In this case, that is, when applying an applied voltage higher than 0.9V, moisture breaks down at the interface between the exhaust side electrode 52 and the solid electrolyte layer 51. Due to this, as shown in FIG. 10B by (A/F)l, at the output current I, the applied voltage V rapidly rises.

In this regard, if an air-fuel ratio sensor 40 or 41 has a crack of element, the exhaust gas, as shown in FIG. 6, enters the reference gas chamber 55. That is, at FIG. 10A, the exhaust gas enters the atmosphere side. At this time, if the air-fuel ratio of the exhaust gas is the lean air-fuel ratio, exhaust gas of a lean air-fuel ratio enters into the reference gas chamber 55. If exhaust gas of a lean air-fuel ratio enters the reference gas chamber 55, the concentration of oxygen in the reference gas chamber 55 falls somewhat. However, in this case, the atmosphere side oxygen partial pressure Pa continues to be higher than the exhaust side oxygen partial pressure Pd. Further, at this time, the ratio of the atmosphere side oxygen partial pressure Pa and the exhaust side oxygen partial pressure Pd is not that large, and therefore an electromotive force E of 0.1V or so is generated. In this case, even if the applied voltage V is increased, since the amount of oxygen fed to the surface of the exhaust side electrode 52 is regulated, the amount of oxygen ions sent in by the pumping action is restricted to a constant amount. Therefore, as shown in FIG. 10B by (A/F)l, the output current I is maintained constant even if the applied voltage V changes, that is, a limit current is generated. Therefore, even if an air-fuel ratio sensor 40 or 41 has a crack of element, the output current I will change with respect to a change in the applied voltage V in the same way as when normal.

Figure 11A:
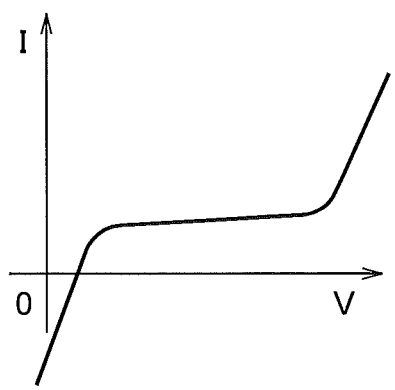
FIGS. 11A, 11B, and 11C are views showing an output current I of an air-fuel ratio sensor.
Figure 11B:
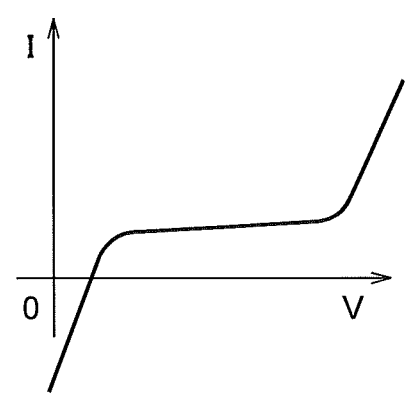

FIG. 11A shows the change of the output current I in the case where an air-fuel ratio sensor 40 or 41 is normal and when the air-fuel ratio of the exhaust gas is a lean air-fuel ratio, while FIG. 11B shows the change of the output current I in the case where an air-fuel ratio sensor 40 or 41 has a crack of element and when the air-fuel ratio of the exhaust gas is a lean air-fuel ratio. As will be understood from a comparison of FIG. 11A and FIG. 11B, if the air-fuel ratio of the exhaust gas is a lean air-fuel ratio, whether the air-fuel ratio sensor 40 or 41 is normal or the air-fuel ratio sensor 40 or 41 has a crack of element, the pattern of change of the output current I with respect to change of the applied voltage V is almost the same. Therefore, as shown in FIG. 7, if the air-fuel ratio A/F of the exhaust gas is a lean air-fuel ratio, whether the air-fuel ratio sensor 40 or 41 is normal or the air-fuel ratio sensor 40 or 41 has a crack of element, the output current I of the air-fuel ratio sensor 40 or 41 will increase by substantially the same values if the air-fuel ratio A/F becomes higher. Therefore, the change of the output current I when the air-fuel ratio of the exhaust gas is lean cannot be used to judge whether the air-fuel ratio sensor 40 or 41 has a crack of element.

Figure 11C:
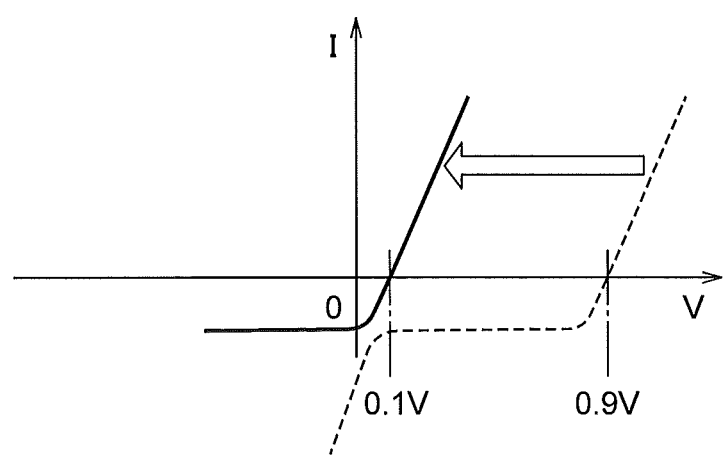

As opposed to this, when an air-fuel ratio sensor 40 or 41 suffers from a crack of element, if the air-fuel ratio of the exhaust gas becomes a rich air-fuel ratio, the output current I will greatly change compared with normal times. That is, when an air-fuel ratio sensor 40 or 41 has a crack of element, if the air-fuel ratio of the exhaust gas becomes a rich air-fuel ratio, a large amount of unburned gas enters into the reference gas chamber 55. That is, at FIG. 10A, a large amount of unburned gas enters the atmosphere side. If a large amount of unburned gas enters inside the reference gas chamber 55, the unburned gas reacts with oxygen on the surface of the atmosphere side electrode 53, therefore the surface of the atmosphere side electrode 53 becomes an oxygen deficient state. At this time, the ratio of the oxygen partial pressure Pa on the surface of the atmosphere side electrode 53 and the oxygen partial pressure Pd on the surface of the exhaust side electrode 52 becomes smaller, therefore the electromotive force E which is generated at this time becomes about 0.1V. When in this way an electromotive force E of 0.1V or so is generated, if a applied voltage V of 0.1V or so is applied, the electromotive force E and the applied voltage V become opposite in polarities, and therefore as shown in FIG. 11C by the solid line, the output current I of the air-fuel ratio sensor 40 or 41 becomes zero. If lowering the applied voltage V from this state, the oxygen ions will start to move toward the exhaust side electrode 52. However, at this time, as explained above, the amount of unburned gas fed to the surface of the exhaust side electrode 52 is regulated by the diffusion regulation layer 54. Therefore, even if making the applied voltage V fall, the amount of oxygen ions reaching the exhaust side electrode 52 is restricted to a constant amount. Therefore, as shown in FIG. 11C by the solid line, the output current I is maintained constant even if the applied voltage V changes, that is, a limit current is generated.

On the other hand, when in this way an electromotive force E of 0.1V or so is generated, no oxygen is present on the surface of the exhaust side electrode 52. Therefore, at this time, even if applying an applied voltage higher than 0.1V, oxygen ions will not move toward the atmosphere side electrode 53. In this case, that is, if applying an applied voltage V higher than 0.1V, moisture breaks down at the interface between the exhaust side electrode 52 and the solid electrolyte layer 51. Due to this, as shown in FIG. 11C by the solid line, the output current I becomes one where the applied voltage V rapidly rises. That is, when an air-fuel ratio sensor 40 or 41 has a crack of element, if the air-fuel ratio of the exhaust gas becomes a rich air-fuel ratio, as shown at FIG. 11C by the solid line, the pattern of change of the output current I becomes the pattern of change of the normal output current I shown in FIG. 11C by the broken line moved, as shown by the arrow, in a direction lowering the applied voltage V by exactly the amount of fall of the electromotive force E (0.8V). Therefore, when an air-fuel ratio sensor 40 or 41 has a crack of element, if the air-fuel ratio of the exhaust gas becomes a rich air-fuel ratio, as shown in FIG. 7 and FIGS. 8A and 8B, the output current I of the air-fuel ratio sensor 40 or 41 becomes a positive current value, that is, the output air-fuel ratio of the air-fuel ratio sensor 40 or 41 indicates a lean air-fuel ratio. Further, at this time, as shown in FIGS. 8A and 8B, if making the applied voltage V to the air-fuel ratio sensor 40 or 41 increase, the output current I of the air-fuel ratio sensor 40 or 41 rapidly increases.

Figure 12:
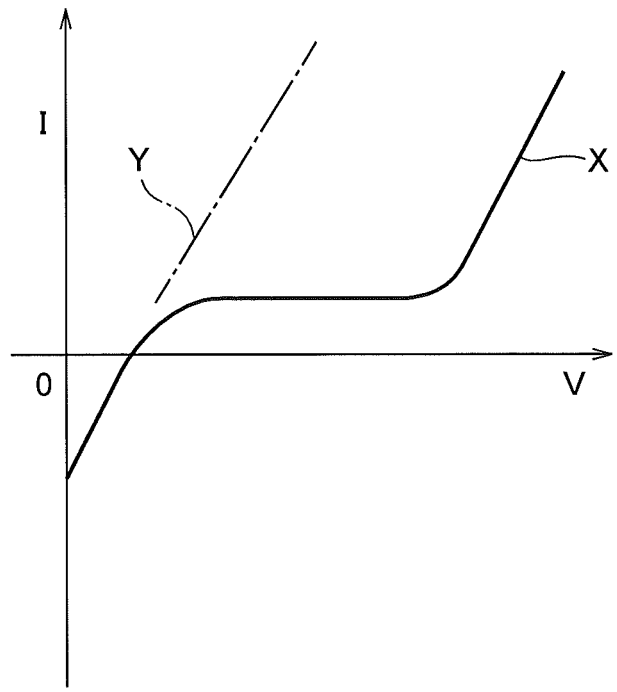
FIG. 12 is a view showing an output current I of an air-fuel ratio sensor.

FIG. 12 shows the change in the output current shown in FIG. 11B by X and shows the change of the output current shown by the solid line in FIG. 11C by Y. That is, at FIG. 12, X shows the change of the output current I with respect to the applied voltage V in the case where the air-fuel ratio sensor 40 or 41 is normal or the case where the air-fuel ratio sensor 40 or 41 has a crack of element and when the air-fuel ratio A/F of the exhaust gas is made the lean air-fuel ratio. On the other hand, Y shows the change of the output current I with respect to the applied voltage V in the case where the air-fuel ratio sensor 40 or 41 has a crack of element and when the air-fuel ratio A/F of the exhaust gas is made a rich air-fuel ratio. In this regard, when the air-fuel ratio sensor 40 or 41, for example, the downstream side air-fuel ratio sensor 41, has a crack of element, when the air-fuel ratio of the exhaust gas is made a rich air-fuel ratio, as shown in FIG. 12 by Y, the output current I of the downstream side air-fuel ratio sensor 41 becomes a positive current value. That is, the output air-fuel ratio of the downstream side air-fuel ratio sensor 41 is shown as the lean air-fuel ratio. Therefore, it appears that when the air-fuel ratio A/F of the exhaust gas is made the rich air-fuel ratio, if the output current I of the downstream side air-fuel ratio sensor 41 becomes the positive current value, that is, if the output air-fuel ratio of the downstream side air-fuel ratio sensor 41 is shown as the lean air-fuel ratio, it can be judged that the downstream side air-fuel ratio sensor 41 has a crack of element.

However, in fact, even if the downstream side air-fuel ratio sensor 41 is normal, when the air-fuel ratio A/F of the exhaust gas is made a rich air-fuel ratio, sometimes the output current I of the downstream side air-fuel ratio sensor 41 becomes a positive current value, that is, sometimes the output air-fuel ratio of the downstream side air-fuel ratio sensor 41 indicates a lean air-fuel ratio. For example, sometimes, there is variation in the air-fuel ratio between cylinders, and thus the air-fuel ratio of a specific cylinder greatly deviates to the rich side with respect to other cylinders, and due to the shape, etc., of the exhaust passage, sometimes the upstream side air-fuel ratio sensor does not uniformly contact exhaust gas flowing out from the different cylinders and mainly contacts the exhaust gas flowing out from the cylinder deviating to the rich side. In such a case, if using the output signal of the upstream side air-fuel ratio sensor as the basis to control the air-fuel ratio to the stoichiometric air-fuel ratio by feedback, the amount of fuel injection to each cylinder is decreased, and the average air-fuel ratio becomes lean. In this state, even if the amount of fuel injection to each cylinder is increased so as to make the air-fuel ratio the rich air-fuel ratio, sometimes the average air-fuel ratio becomes the lean air-fuel ratio. In this case, even if the downstream side air-fuel ratio sensor 41 is normal, when the target air-fuel ratio is made the rich air-fuel ratio, the output air-fuel ratio of the downstream side air-fuel ratio sensor 41 indicates a lean air-fuel ratio.

Further, sometimes the downstream side air-fuel ratio sensor 41 does not uniformly contact the exhaust gas flowing out from the cylinders but mainly contacts the exhaust gas flowing out from the cylinder deviated to the lean side. In such a state, even if the amount of injection of fuel to each cylinder is increased to make the air-fuel ratio the rich air-fuel ratio, the air-fuel ratio of the exhaust gas contacting the downstream side air-fuel ratio sensor sometimes remains lean. In this case, even if the downstream side air-fuel ratio sensor 41 were normal, when the target air-fuel ratio is made a rich air-fuel ratio, the output air-fuel ratio of the downstream side air-fuel ratio sensor 41 indicates the lean air-fuel ratio. Therefore, when the target air-fuel ratio is made the rich air-fuel ratio, when the output air-fuel ratio of the downstream side air-fuel ratio sensor 41 indicates a lean air-fuel ratio, it is mistakenly judged that the downstream side air-fuel ratio sensor 41 has a crack of element.

If, in this way, the downstream side air-fuel ratio sensor 41 is normal, when the target air-fuel ratio is made the rich air-fuel ratio, sometimes the output current I of the downstream side air-fuel ratio sensor 41 becomes a positive current value, that is, sometimes the output air-fuel ratio of the downstream side air-fuel ratio sensor 41 indicates the lean air-fuel ratio.

In this regard, as explained above, if applying a voltage higher than the voltage which the limit current generates, moisture breaks down at the interface of the exhaust side electrode 52 and the solid electrolyte layer 51 whereby the output current I rises along with a rise in the applied voltage V. At this time, the extent of rise of the output current I changes according to the temperature of the downstream side air-fuel ratio sensor 41.

Figure 13:
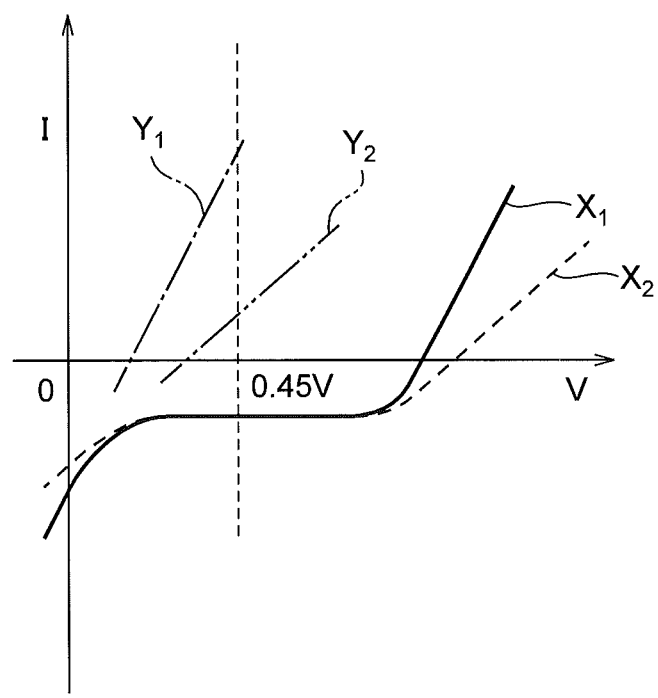
FIG. 13 is a view showing an output current I of an air-fuel ratio sensor.

FIG. 13 shows the relationship between the applied voltage V and the output current I when the air-fuel ratio of the exhaust gas is the rich air-fuel ratio. $X_1$ in the figure shows the relationship when the downstream side air-fuel ratio sensor 41 is normal and its temperature is a high temperature (for example, 700° C.), while $X_2$ in the figure shows the relationship when the downstream side air-fuel ratio sensor 41 is normal and its temperature is a low temperature (for example, 650° C.) On the other hand, $Y_1$ in the figure shows the relationship when the downstream side air-fuel ratio sensor 41 has a crack of element and its temperature is a high temperature, while $Y_2$ in the figure shows the relationship when the downstream side air-fuel ratio sensor 41 has a crack of element and its temperature is a low temperature.

As shown in FIG. 13, when the downstream side air-fuel ratio sensor 41 is normal, both when the temperature of the downstream side air-fuel ratio sensor 41 is a high temperature and when it is a low temperature, at the downstream side air-fuel ratio sensor 41, the same output current I is generated in the range of substantially the same applied voltage V. However, in the region where the applied voltage is higher than the voltage which the limit current generates, when the temperature of the downstream side air-fuel ratio sensor 41 is a high temperature, compared to when it is a low temperature, the amount of rise of the output current I accompanying the rise of applied voltage V is large. This is believed to be because in the region of an applied voltage higher than the voltage which the limit current generates, moisture breaks down at the interface between the exhaust side electrode 52 and the solid electrolyte layer 51, but the breakdown reaction proceeds more the higher the temperature of the downstream side air-fuel ratio sensor 41.

On the other hand, if the downstream side air-fuel ratio sensor 41 has a crack of element, as explained above, when the air-fuel ratio of the exhaust gas is a rich air-fuel ratio, the output current I of the downstream side air-fuel ratio sensor 41 becomes a positive current value. At this time, if the temperature of the downstream side air-fuel ratio sensor 41 is a high temperature, compared with when it is a low temperature, the amount of rise of the output current I accompanying the rise of the applied voltage V is large.

In this way, if the downstream side air-fuel ratio sensor 41 is normal, even if the temperature of the downstream side air-fuel ratio sensor 41 is changed, the output current I does not change. As opposed to this, if the downstream side air-fuel ratio sensor 41 has a crack of element, if the air-fuel ratio A/F of the exhaust gas is the rich air-fuel ratio, the output current I increases along with the rise of the temperature of the downstream side air-fuel ratio sensor 41. Therefore, in the state where the air-fuel ratio A/F of the exhaust gas is made the rich air-fuel ratio, it can be accurately judge if the downstream side air-fuel ratio sensor 41 has a crack of element based on the change of the output current I when making the downstream side air-fuel ratio sensor 41 change.

<Diagnosis of Abnormality>

Therefore, in the present embodiment, there is provided an abnormality diagnosis system of a limit current type air-fuel ratio sensor arranged in an exhaust passage of an internal combustion engine and generating a limit current corresponding to the air-fuel ratio, comprising: a current detecting part 61 detecting an output current I of the air-fuel ratio sensor 40 or 41; and a sensor temperature control device controlling a temperature of the air-fuel ratio sensor 40 or 41, wherein the temperature of the air-fuel ratio sensor 40 or 41 is controlled to a first temperature by the sensor temperature control device, and the output current I of the air-fuel ratio sensor 40 or 41 is detected by the current detecting part 61 when the internal combustion engine controls the air-fuel ratio so that the air-fuel ratio of the exhaust gas flowing around the air-fuel ratio sensor 40 or 41 becomes a rich air-fuel ratio in the state where the temperature of the air-fuel ratio sensor 40 or 41 is made the first temperature, and the temperature of the air-fuel ratio sensor 40 or 41 is controlled to a second temperature higher than the first temperature by the sensor temperature control device and the output current I of the air-fuel ratio sensor 40 or 41 is detected by the current detecting part when the internal combustion engine controls the air-fuel ratio so that the air-fuel ratio of the exhaust gas flowing around the air-fuel ratio sensor 40 or 41 becomes a rich air-fuel ratio in the state where the temperature of the air-fuel ratio sensor 40 or 41 is made the second temperature, and the system judges that the air-fuel ratio sensor 40 or 41 has become abnormal when the output current I when controlling the temperature of the air-fuel ratio sensor 40 or 41 to the first temperature is larger than a difference from output current when controlling the temperature of the air-fuel ratio sensor 40 or 41 to the second temperature by a predetermined value or more.

Figure 14:
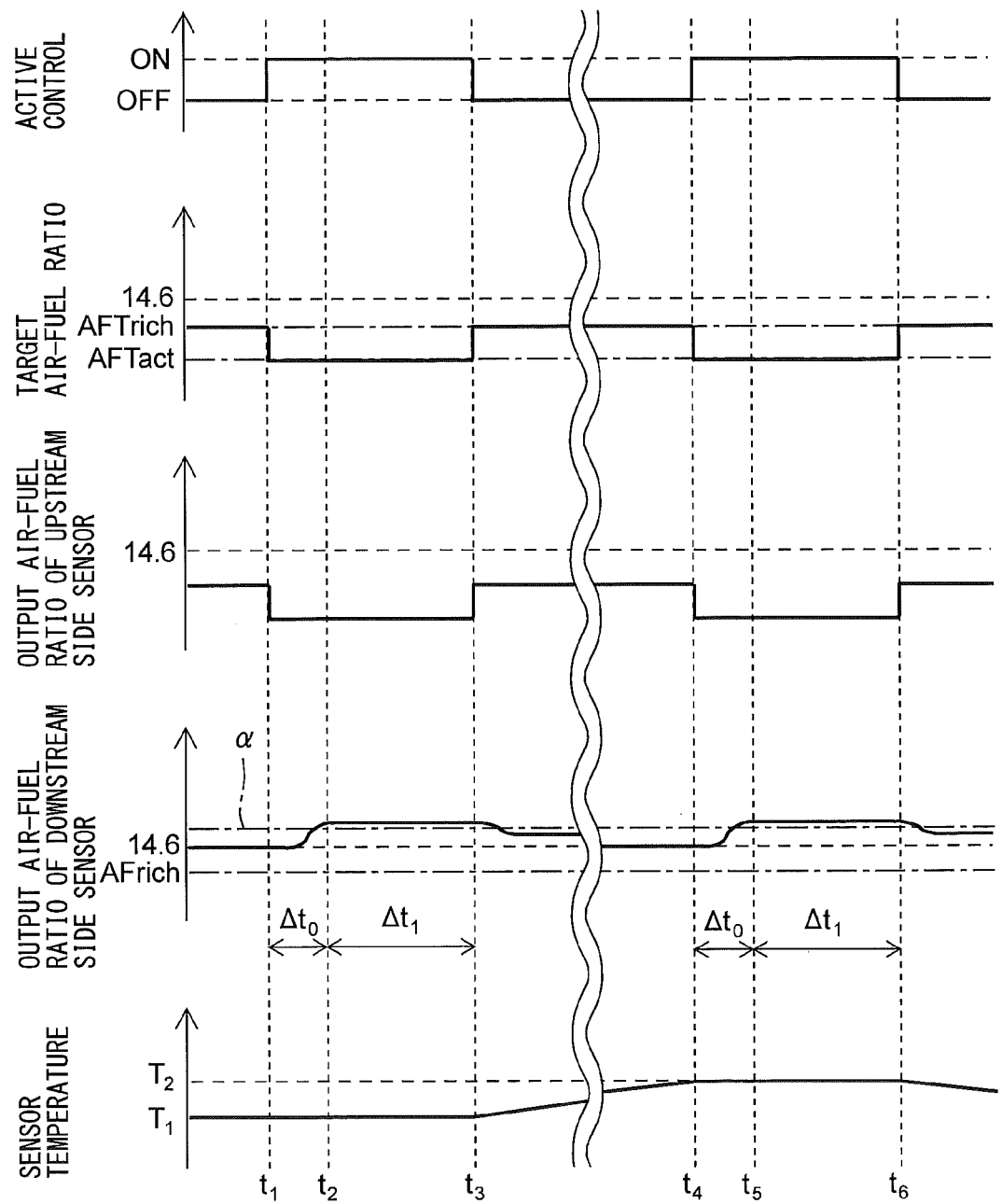
FIG. 14 is a time chart showing a change of an output air-fuel ratio of a downstream side air-fuel ratio sensor, etc., when executing active control.
Figure 15:
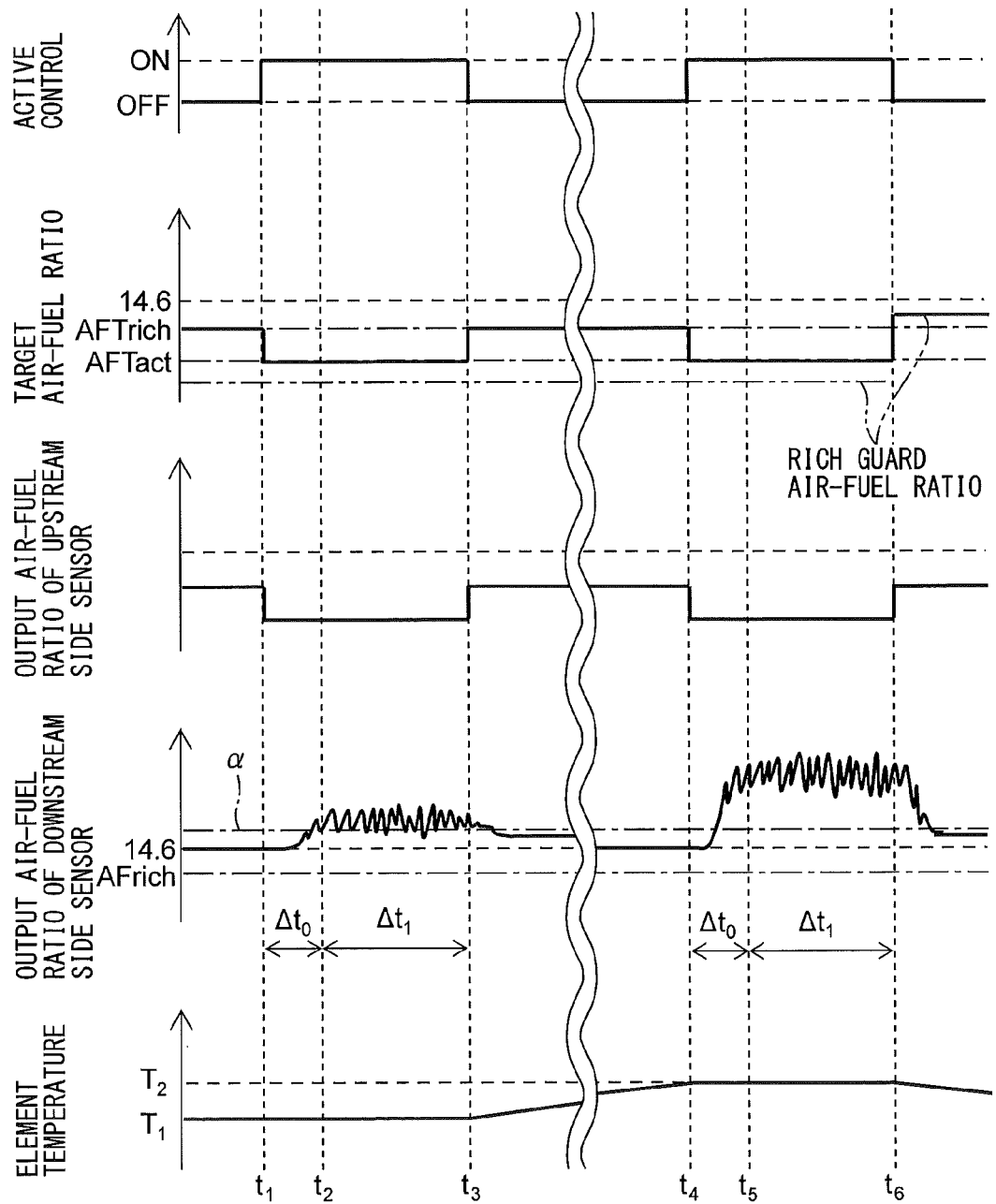
FIG. 15 is a time chart showing a change of an output air-fuel ratio of a downstream side air-fuel ratio sensor, etc., when executing active control.

Next, referring to the time charts shown in FIG. 14 and FIG. 15, the case of detecting a crack of element of the downstream side air-fuel ratio sensor 41 will be used as an example to explain the diagnosis of abnormality of an air-fuel ratio sensor in the present embodiment. In the present embodiment, as already explained referring to FIG. 5, normally, the target air-fuel ratio is alternately changed between the rich set air-fuel ratio AFTrich and the lean set air-fuel ratio AFTlean. If referring to control alternately changing the target air-fuel ratio between the rich set air-fuel ratio AFTrich and the lean set air-fuel ratio AFTlean in this way as "normal control", when diagnosing abnormality of the downstream side air-fuel ratio sensor 41, "active control" in which the target air-fuel ratio is made richer than the rich set air-fuel ratio AFTrich at the time of this normal control is performed. Therefore, this active control can be said to be performed by controlling the amount of fuel injection from the fuel injector 11 so that the air-fuel ratio of the exhaust gas flowing into the upstream side exhaust purification catalyst 20 becomes a rich air-fuel ratio.

FIG. 14 and FIG. 15 are time charts showing the presence of this active control, the target air-fuel ratio, the output air-fuel ratio of the upstream side air-fuel ratio sensor 40, the output air-fuel ratio of the downstream side air-fuel ratio sensor 41, and the change in the temperature of the downstream side air-fuel ratio sensor 41. Note that, FIG. 14 shows the case where the downstream side air-fuel ratio sensor 41 does not have a crack of element, but when making the target air-fuel ratio the rich air-fuel ratio, the output air-fuel ratio of the downstream side air-fuel ratio sensor 41 becomes the lean air-fuel ratio. FIG. 15 shows the case where the downstream side air-fuel ratio sensor 41 has a crack of element, and therefore when making the target air-fuel ratio the rich air-fuel ratio, the output air-fuel ratio of the downstream side air-fuel ratio sensor 41 becomes a lean air-fuel ratio. Note that, as will be understood from a comparison of FIG. 14 and FIG. 15, at FIG. 14 and FIG. 15, the presence of active control, the target air-fuel ratio, the output air-fuel ratio of the upstream side air-fuel ratio sensor 40, and the temperature of the downstream side air-fuel ratio sensor 41 change in the same way. Therefore, first, the presence of active control, the target air-fuel ratio, the output air-fuel ratio of the upstream side air-fuel ratio sensor, and the temperature of the downstream side air-fuel ratio sensor 41 will be explained.

In the examples shown in FIG. 14 and FIG. 15, at the time $t_1$, active control starts to be executed. In these examples, the case is shown where before active control is started at the time $t_1$, the target air-fuel ratio becomes the rich set air-fuel ratio AFTrich in normal control alternately changing the target air-fuel ratio between the rich air-fuel ratio and lean air-fuel ratio. At this time, the output air-fuel ratio of the upstream side air-fuel ratio sensor 40 becomes the rich air-fuel ratio. That is, at this time, at the electronic control unit (ECU) 31, it is judged that the air-fuel ratio of the exhaust gas flowing into the upstream side exhaust purification catalyst 20 has become the rich set air-fuel ratio AFTrich, based on the output air-fuel ratio of the upstream side air-fuel ratio sensor 40. Further, at this time, the temperature of the downstream side air-fuel ratio sensor 41 is made the predetermined first temperature $T_1$.

Next, if at the time $t_1$ the active control starts to be executed, the target air-fuel ratio is set to the rich air-fuel ratio. At this time, in the example shown in FIG. 14 and FIG. 15, the target air-fuel ratio at the time of execution of active control is made the active control time air-fuel ratio AFTact richer than the rich set air-fuel ratio AFTrich at the time of normal control. At this time, the output air-fuel ratio of the upstream side air-fuel ratio sensor 40 also becomes a further rich rich air-fuel ratio. On the other hand, at this time, the temperature of the downstream side air-fuel ratio sensor 41 is not changed but is maintained at the predetermined first temperature $T_1$. Note that, in FIG. 14 and FIG. 15, $\Delta t_0$ indicates the elapsed time from when the air-fuel ratio of the exhaust gas around the upstream side air-fuel ratio sensor 40 is made the rich air-fuel ratio so as to diagnose abnormality of the downstream side air-fuel ratio sensor 41. This elapsed time $\Delta t_0$ is a time after the target air-fuel ratio is made the rich air-fuel ratio, then thereby the atmosphere around the downstream side air-fuel ratio sensor 41 changes or a greater time. That is, the elapsed time $\Delta t_0$ is made a time sufficient for the oxygen storage amount of the upstream side exhaust purification catalyst 20 to decrease from the maximum storable amount of oxygen to substantially zero after the target air-fuel ratio is made a rich air-fuel ratio. In the examples shown in FIG. 14 and FIG. 15, this elapsed time $\Delta t_0$ is made constant. Therefore, in the examples shown in FIG. 14 and FIG. 15, the output value for diagnosis of abnormality of the downstream side air-fuel ratio sensor 41 starts to be detected at the time $t_2$ after a certain time $\Delta t_0$ elapses from when the target air-fuel ratio is made the active control time air-fuel ratio AFTact.

If, as shown in FIG. 14 and FIG. 15, the output value for diagnosis of abnormality of the downstream side air-fuel ratio sensor 41 starts to be detected at the time $t_2$, during a predetermined certain time $\Delta t_1$, the temperature of the downstream side air-fuel ratio sensor is maintained at the predetermined first temperature $T_1$ shown in FIG. 14, for example, 650° C. Then, if this predetermined certain time $\Delta t_1$ elapses, the active control is ended and normal control is resumed. In addition, the temperature of the downstream side air-fuel ratio sensor 41 is made to rise.

Then, if the temperature of the downstream side air-fuel ratio sensor 41 reaches a second temperature $T_2$ higher than the first temperature $T_1$, for example, reaches 700° C., active control is again started. At the time $t_4$, if active control is started, the target air-fuel ratio is made the active control time air-fuel ratio AFTact. At this time, the temperature of the downstream side air-fuel ratio sensor 41 is not changed but is maintained at a predetermined second temperature $T_2$. In the examples shown in FIG. 14 and FIG. 15, after a certain time $\Delta t_0$ has elapsed from when the target air-fuel ratio is made the active control time air-fuel ratio AFTact, at the time $t_5$, detection of the output value for diagnosis of abnormality of the downstream side air-fuel ratio sensor 41 is started.

As shown in FIG. 14 and FIG. 15, if, at the time $t_5$, the output value for diagnosis of abnormality of the downstream side air-fuel ratio sensor 41 starts to be detected, the temperature of the downstream side air-fuel ratio sensor is maintained at the predetermined first temperature $T_2$ shown in FIG. 14 for a predetermined certain time $\Delta t_1$. Then, at the time $t_6$ after the elapse of this predetermined certain time $\Delta t_1$, the active control is ended and normal control is resumed. In addition, the temperature of the downstream side air-fuel ratio sensor 41 is made to decrease to the first temperature $T_1$.

Next, referring to FIG. 14 and FIG. 15, the change in the output air-fuel ratio of the downstream side air-fuel ratio sensor 41 when active control is being executed will be explained. First, to start, if referring to FIG. 14, this FIG. 14 shows the case where, as explained above, the downstream side air-fuel ratio sensor 41 does not have a crack of element but when the target air-fuel ratio is made the rich air-fuel ratio, the output air-fuel ratio of the downstream side air-fuel ratio sensor 41 becomes leaner than a predetermined lean judged air-fuel ratio α, for example, 15.0. As an example of such a case, for example, as explained above, there is variation in the air-fuel ratio between cylinders, and thus the air-fuel ratio of a specific cylinder will sometimes greatly deviate to the rich side from another cylinder, and depending on the shape, etc., of the exhaust passage, the upstream side air-fuel ratio sensor 40 will sometimes not uniformly contact the exhaust gas flowing out from the cylinders but will mainly contact the exhaust gas flowing out from the cylinder deviated to the rich side. In this case, the output current I changes as shown by $X_1, X_2$ of FIG. 13 so that a limit current region is formed. Therefore, in this case, as will be understood from FIG. 13, even if making the temperature of the downstream side air-fuel ratio sensor 41 change from a predetermined first temperature $T_1$ to a second temperature $T_2$, the output current I of the downstream side air-fuel ratio sensor 41 will not change much at all (however, in actuality, at the time of high temperature, the output current becomes larger—though slightly). Therefore, as shown in FIG. 14, between the period from the time $t_2$ to $t_3$ where the temperature of the downstream side air-fuel ratio sensor 41 has become the first temperature $T_1$ and the period from the time $t_5$ to $t_6$ where it has become the second temperature $T_2$, the output air-fuel ratio of the downstream side air-fuel ratio sensor 41 does not change much at all.

On the other hand, FIG. 15 shows the case where the downstream side air-fuel ratio sensor 41 has a crack of element and therefore when making the target air-fuel ratio the rich air-fuel ratio, the output air-fuel ratio of the downstream side air-fuel ratio sensor 41 becomes leaner than a predetermined lean judged air-fuel ratio α, for example 15.0. In this case, as shown in FIG. 13 by $Y_1, Y_2$, not only does the output current I of the downstream side air-fuel ratio sensor 41 become a positive current value, that is, not only does the output air-fuel ratio of the downstream side air-fuel ratio sensor 41 indicate the lean air-fuel ratio, but also the output current I of the downstream side air-fuel ratio sensor 41 increases along with the rise of the temperature of the downstream side air-fuel ratio sensor 41. Therefore, in this case, as shown in FIG. 15, rather than in the period from the times $t_2$ to $t_3$ when the temperature of the downstream side air-fuel ratio sensor 41 becomes the first temperature $T_1$, the output air-fuel ratio of the downstream side air-fuel ratio sensor 41 becomes leaner in the period from the times $t_5$ to $t_6$ when it becomes the second temperature $T_2$. Therefore, in the state where the target air-fuel ratio A/F is made the rich air-fuel ratio, that is, in the state where the air-fuel ratio of the exhaust gas which flows around the downstream side air-fuel ratio sensor 41 is made a rich air-fuel ratio, the difference of the output current I when making the temperature of the downstream side air-fuel ratio sensor 41 $T_1$ and when making it $T_2$, that is, the difference of the output air-fuel ratio of the downstream side air-fuel ratio sensor 41, can be used to accurately judge if the downstream side air-fuel ratio sensor 41 has a crack of element.

Note that, at FIG. 15, at the time $\Delta t_1$ when the temperature of the downstream side air-fuel ratio sensor 41 is made the first temperature $T_1$, if the output air-fuel ratio of the downstream side air-fuel ratio sensor 41 does not become leaner than a predetermined lean judged air-fuel ratio α, for example, 15.0, it can be judged that the downstream side air-fuel ratio sensor 41 does not have a crack of element. Therefore, in this case, it is meaningless to change the temperature of the downstream side air-fuel ratio sensor 41 to the second temperature $T_2$. Therefore, at this time, the abnormality diagnosis of the air-fuel ratio sensor is ended. Therefore, in the present embodiment, at the time $\Delta t_1$ where the temperature of the downstream side air-fuel ratio sensor 41 is made the first temperature $T_1$, it is provisionally judged that the output air-fuel ratio of the downstream side air-fuel ratio sensor 41 is leaner than the predetermined lean judged air-fuel ratio α. Further, by this provisional judgment, at the time $\Delta t_1$ where the temperature of the downstream side air-fuel ratio sensor 41 is made the first temperature $T_1$, when it is judged that the output air-fuel ratio of the downstream side air-fuel ratio sensor 41 is not leaner than the predetermined lean judged air-fuel ratio α, the diagnosis of abnormality of the downstream side air-fuel ratio sensor 41 is made to end. As opposed to this, it is first when it is judged in this provisional judgment at the time $\Delta t_1$ when the temperature of the downstream side air-fuel ratio sensor 41 is made the first temperature $T_1$, that the output air-fuel ratio of the downstream side air-fuel ratio sensor 41 is leaner than a predetermined lean judged air-fuel ratio α, that the temperature of the downstream side air-fuel ratio sensor 41 is made to rise from the first temperature $T_1$ to the second temperature $T_2$. At this time, it is judged if the output current I of the downstream side air-fuel ratio sensor 41 has increased, that is, if the downstream side air-fuel ratio sensor 41 has a crack of element.

That is, in the present embodiment, when the air-fuel ratio is controlled so that the air-fuel ratio of the exhaust gas flowing around the air-fuel ratio sensor 40 or 41 becomes the rich air-fuel ratio in the state where the temperature of the air-fuel ratio sensor 40 or 41 is made the first temperature $T_1$, it is provisionally judged that the air-fuel ratio sensor 40 or 41 is abnormal if the output current I of the air-fuel ratio sensor 40 or 41 becomes a current value indicating an air-fuel ratio of a predetermined lean air-fuel ratio or more. When it is provisionally judged that the air-fuel ratio sensor 40 or 41 is abnormal, the system controls the temperature of the air-fuel ratio sensor 40 or 41 to the second temperature $T_2$ and uses the current detecting part 61 to detect the output current of the air-fuel ratio sensor 40 or 41 when the air-fuel ratio is controlled so that the air-fuel ratio of the exhaust gas flowing around the air-fuel ratio sensor 40 or 41 becomes a rich air-fuel ratio in the state where the temperature of the air-fuel ratio sensor 40 or 41 is made a second temperature $T_2$, and finally judges that an air-fuel ratio sensor 40 or 41 has the abnormality of a crack of element if the output current when controlling the temperature of the air-fuel ratio sensor 40 or 41 to the first temperature $T_1$ is larger than the output current when controlling it to the second temperature $T_2$ by a predetermined value or more.

Note that, the output current I of the downstream side air-fuel ratio sensor 41 fluctuates as shown in FIG. 8B, while the output air-fuel ratio of the downstream side air-fuel ratio sensor 41 fluctuates as shown in FIG. 15. Therefore, to accurately detect the output current I of the downstream side air-fuel ratio sensor 41 or the true value of the output air-fuel ratio of the downstream side air-fuel ratio sensor 41 as accurately as possible, it can be said preferable to find the average value of the output current I of the downstream side air-fuel ratio sensor 41 or the output air-fuel ratio of the downstream side air-fuel ratio sensor 41.

Therefore, in the present embodiment, for diagnosis of abnormality of the air-fuel ratio sensor 40 or 41, the average value of the output current I of the air-fuel ratio sensor 40 or 41 when controlling the temperature of the air-fuel ratio sensor 40 or 41 to the first temperature $T_1$ and when the air-fuel ratio is controlled so that the air-fuel ratio of the exhaust gas flowing around the air-fuel ratio sensor 40 or 41 becomes the rich air-fuel ratio is used. That is, for diagnosis of abnormality of the air-fuel ratio sensor 40 or 41, the average value of the output current I of the air-fuel ratio sensor 40 or 41 at the times $t_2$ to $t_3$ is used. Similarly, in the present embodiment, for diagnosis of abnormality of the air-fuel ratio sensor 40 or 41, the average value of the output current I of the air-fuel ratio sensor 40 or 41 when controlling the temperature of the air-fuel ratio sensor 40 or 41 to the second temperature $T_2$ and when the air-fuel ratio is controlled so that the air-fuel ratio of the exhaust gas flowing around the air-fuel ratio sensor 40 or 41 becomes the rich air-fuel ratio is used. That is, for diagnosis of abnormality of the air-fuel ratio sensor 40 or 41, the average value of the output current I of the air-fuel ratio sensor 40 or 41 at the time $t_5$ to $t_6$ is used. Therefore, the output current I when the temperature of the air-fuel ratio sensor 40 or 41 used for judgment of abnormality of the air-fuel ratio sensor 40 or 41 is controlled to the first temperature $T_1$ or the second temperature $T_2$ is made the average value of the output current I of the air-fuel ratio sensor 40 or 41 when controlling the air-fuel ratio sensor 40 or 41 to the first temperature $T_1$ or the second temperature $T_2$.

Further, if an air-fuel ratio sensor 40 or 41 has a crack of element, as explained above, even if the air-fuel ratio of the surroundings is a rich air-fuel ratio, the output air-fuel ratio of the air-fuel ratio sensor 40 or 41 becomes a lean air-fuel ratio. As a result, if executing normal control such as explained above, the time during which the target air-fuel ratio is set to the rich air-fuel ratio becomes longer and therefore the air-fuel ratio of the exhaust gas flowing into the upstream side exhaust purification catalyst 20 ends up deviating to the rich air-fuel ratio. Therefore, in the present embodiment, if it is judged that an air-fuel ratio sensor 40 or 41 has the abnormality of a crack of element, the upper limit value of the rich degree at which the target air-fuel ratio can be set (lower limit value of settable target air-fuel ratio), that is, the rich guard air-fuel ratio, is made to increase. In particular, in the example shown in FIG. 15, at the time $t_6$, it is judged that the downstream side air-fuel ratio sensor 41 has the abnormality of a crack of element, so the rich degree of the rich guard air-fuel ratio is lowered. As a result, the rich guard air-fuel ratio becomes a value with a lower rich degree than the rich set air-fuel ratio AFTrich. For this reason, at the time $t_6$ on, the target air-fuel ratio is set to the rich guard air-fuel ratio.

Figure 16:
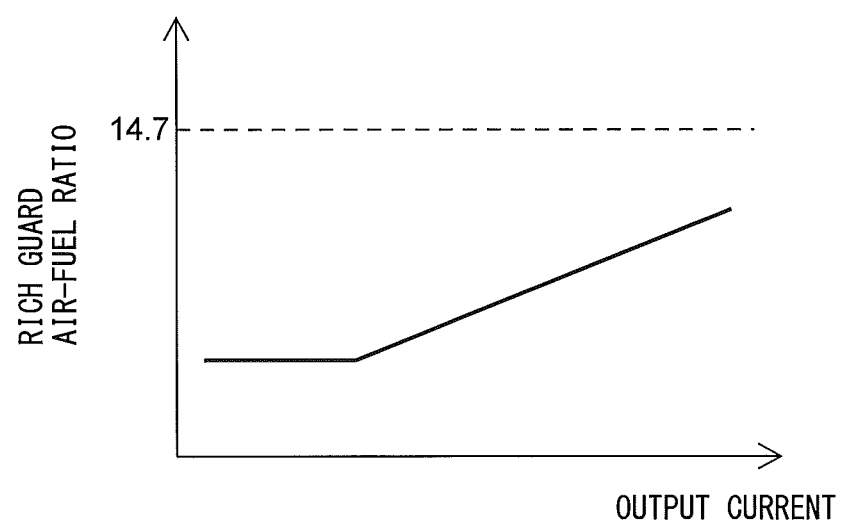
FIG. 16 is a view showing a relationship between an output current of an air-fuel ratio sensor and a rich guard air-fuel ratio.

FIG. 16 shows the relationship between an output current I of an air-fuel ratio sensor 40 or 41 and the rich guard air-fuel ratio when the temperature of the air-fuel ratio sensor 40 or 41 is controlled to the second temperature $T_2$. As will be understood from FIG. 16, the rich guard air-fuel ratio is made a larger air-fuel ratio, that is, the rich degree is made smaller, the larger the output current I, that is, the more to a lean side value the air-fuel ratio corresponding to the output current I becomes. Therefore, the rich degree of the rich guard air-fuel ratio is made to decrease the larger the output current I becomes, that is, the larger the crack of element which is generated. Due to this, the air-fuel ratio of the exhaust gas flowing into the upstream side exhaust purification catalyst 20 can be kept from ending up leaning to the rich air-fuel ratio.

<Flow Chart>

Figure 17:
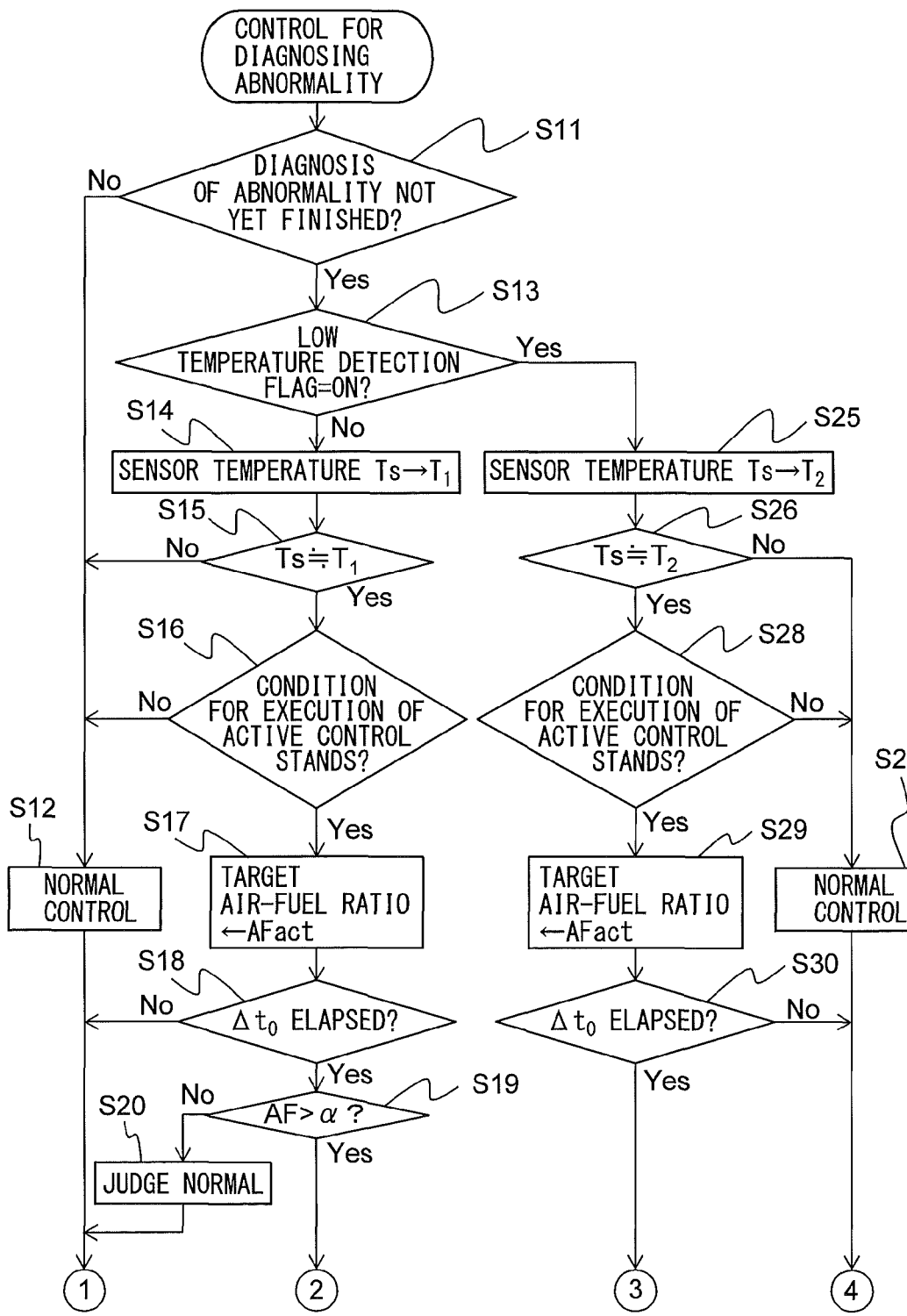
FIG. 17 is a flow chart for diagnosis of abnormality of a downstream side air-fuel ratio sensor.
Figure 18:
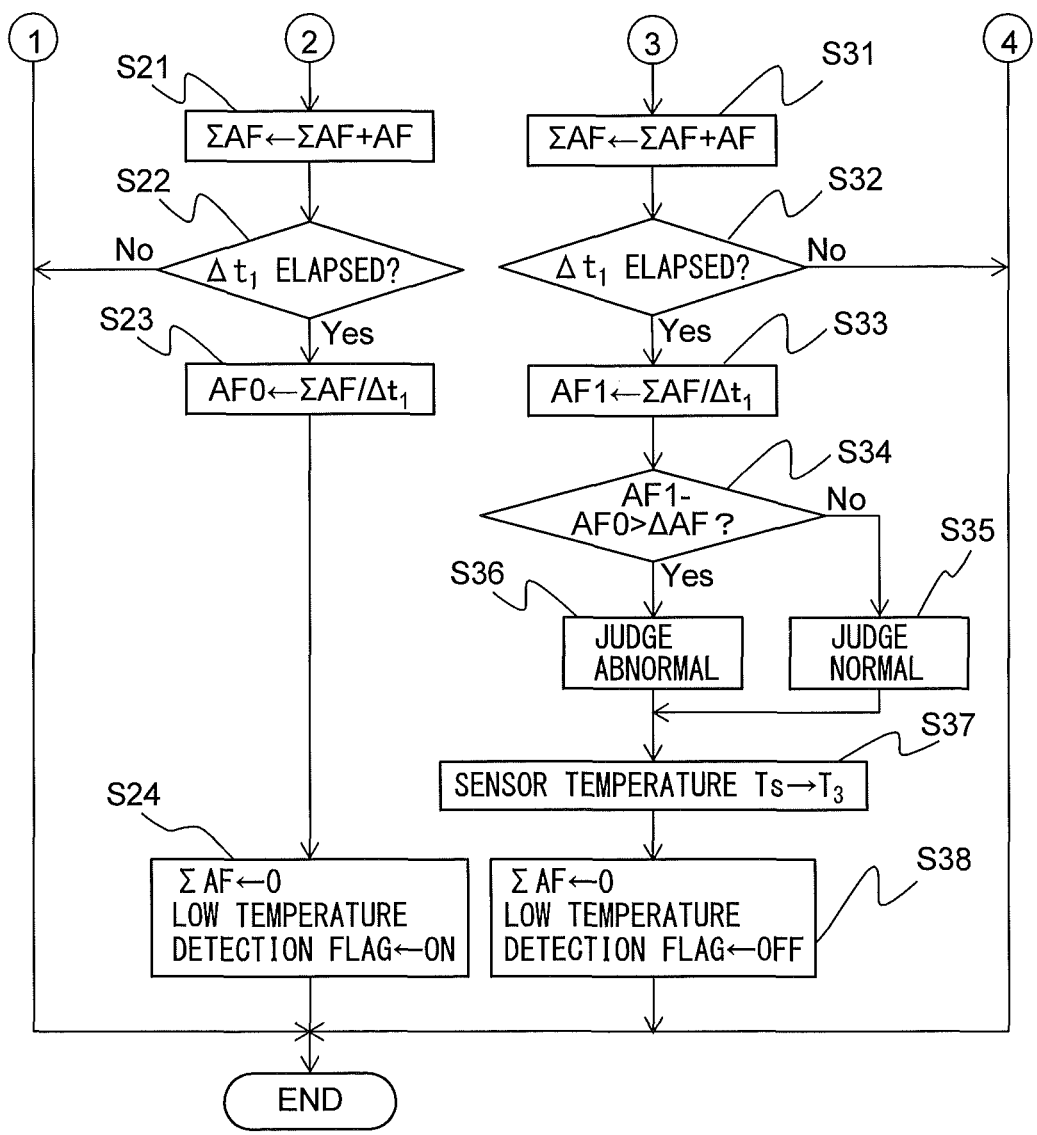
FIG. 18 is a flow chart for diagnosis of abnormality of a downstream side air-fuel ratio sensor.

FIG. 17 and FIG. 18 show an abnormality diagnosis routine of the downstream side air-fuel ratio sensor 41. This routine is executed by interruption every certain time interval.

First, at step S11, after the startup of an internal combustion engine or after the ignition key of a vehicle mounting an internal combustion engine is turned on, it is judged if the diagnosis of abnormality of the downstream side air-fuel ratio sensor 41 is still not completed. If abnormality has already been judged after the startup of the internal combustion engine, the routine proceeds to step S12 where normal control is performed, then the control routine is made to end. As opposed to this, when it is judged that the diagnosis of abnormality has not yet ended, the routine proceeds to step S13 where it is judged if the low temperature detection flag is ON. The low temperature detection flag is a flag which is turned ON when the temperature of the downstream side air-fuel ratio sensor 41 is made the first temperature $T_1$ and in that state the output air-fuel ratio of the downstream side air-fuel ratio sensor 41 finishes being detected and is turned OFF otherwise.

When detection is not completed in the state where the temperature of the downstream side air-fuel ratio sensor 41 is made the first temperature $T_1$, it is judged that the low temperature detection flag is not ON, then the routine proceeds to step S14. At step S14, the temperature Ts of the downstream side air-fuel ratio sensor 41 is controlled by the sensor temperature control device to become the first temperature $T_1$ (for example, 650° C.). Next, at step S15, it is judged if the temperature of the downstream side air-fuel ratio sensor 41 has become a temperature near the first temperature $T_1$. The temperature of the downstream side air-fuel ratio sensor 41 is detected by a circuit (not shown) detecting the impedance of the solid electrolyte layer 51 of the downstream side air-fuel ratio sensor 41. The higher the impedance, the lower the temperature of the downstream side air-fuel ratio sensor 41, that is, the temperature of the solid electrolyte layer 51, that is detected.

When at step S15 it is judged that the temperature of the downstream side air-fuel ratio sensor 41 has not become a temperature near the first temperature $T_1$, the routine proceeds to step S12 where normal control is performed, then the control routine is made to end. On the other hand, if at step S15 it is judged that the temperature of the downstream side air-fuel ratio sensor 41 has become a temperature near the first temperature $T_1$, the routine proceeds to step S16.

At step S16, it is judged if the condition for performing active control stands. This condition for performing active control is judged to stand when the temperatures of the two air-fuel ratio sensors 40, 41 are the active temperatures or more, the intake air amount is a predetermined amount or more, and a predetermined time or more has elapsed after reset from fuel cut control. Here, the intake air amount being a predetermined amount or more is made one of the requirements for standing since if the amount of flow of exhaust gas flowing around the air-fuel ratio sensors 40 and 41 is small, even if the element cracks, a change is unlikely to occur in the output air-fuel ratios of the air-fuel ratio sensors 40 and 41. Further, a predetermined time or more having elapsed after reset from fuel cut control is made one of the requirements for standing because since there is a large amount of oxygen on the surface of the exhaust side electrode 52 for a while after reset from fuel cut control, even if the air-fuel ratio is made the rich air-fuel ratio, there is the danger of the air-fuel ratio sensors 40 and 41 indicating a lean output air-fuel ratio.

When at step S16, it is judged that the condition for performing active control does not stand, the routine proceeds to step S12 where normal control is performed, then the control routine is made to end. As opposed to this, when it is judged that the condition for performing active control does not stand, the routine proceeds to step S17 where the target air-fuel ratio is made an active control time rich set air-fuel ratio AFact richer than the rich set air-fuel ratio AFTrich at the time of normal control, for example, 13.5. Due to this, the air-fuel ratio is made the rich air-fuel ratio and active control is started. Next, at step S18, it is judged if a certain time $\Delta t_0$ has elapsed after active control is started. When a certain time $\Delta t_0$ has not elapsed after active control is started, the control routine is made to end.

On the other hand, when a certain time $\Delta t_0$ has elapsed after active control is started, the routine proceeds to step S19 where it is judged if the output air-fuel ratio AF of the downstream side air-fuel ratio sensor 41 is leaner than a predetermined lean judged air-fuel ratio α, for example, 15.0, that is, if the output current I of the downstream side air-fuel ratio sensor 41 is larger than a set current value corresponding to this lean judged air-fuel ratio α. When the output air-fuel ratio AF of the downstream side air-fuel ratio sensor 41 is smaller than this lean judged air-fuel ratio α, that is, the output current I of the downstream side air-fuel ratio sensor 41 is lower than a set current value corresponding to this lean judged air-fuel ratio α, it is judged that the downstream side air-fuel ratio sensor 41 does not have a crack of element. Therefore, at this time, the routine proceeds to step S20 where it is judged if the downstream side air-fuel ratio sensor 41 is normal.

On the other hand, when at step S19 it is judged that the output air-fuel ratio AF of the downstream side air-fuel ratio sensor 41 is larger than the predetermined lean judged air-fuel ratio α, that is, when it is judged that the output current I of the downstream side air-fuel ratio sensor 41 is larger than the set current value corresponding to this lean judged air-fuel ratio α, the routine proceeds to step S21. At step S21, the output air-fuel ratio AF of the downstream side air-fuel ratio sensor 41 is added to the cumulative value ΣAF of the output air-fuel ratio of the downstream side air-fuel ratio sensor 41. Next, at step S22, it is judged if a certain time $\Delta t_1$ shown in FIG. 14 and FIG. 15 has elapsed. When a certain time $t_1$ has not elapsed, the control routine is made to end.

On the other hand, when a certain time $\Delta t_1$ has elapsed, at the next control routine, the routine proceeds from step S22 to step S23. At step S23, the cumulative value ΣAF of the output air-fuel ratio of the downstream side air-fuel ratio sensor is divided by a certain time $\Delta t_1$ whereby the average value AF0 of the output air-fuel ratio of the downstream side air-fuel ratio sensor 41 in a certain time $\Delta t_1$ is calculated.

Next, at step S24, the cumulative value ΣAF of the output air-fuel ratio of the downstream side air-fuel ratio sensor 41 is cleared, the low temperature detection flag is set to ON, then control routine is made to end.

When the low temperature detection flag is set ON, at the next control routine, the routine proceeds from step S13 to step S25. At step S25, the temperature Ts of the downstream side air-fuel ratio sensor 41 is controlled by the sensor temperature control device to become the second temperature $T_2$ (for example, 700° C.) Next, at step S26, it is judged if the temperature of the downstream side air-fuel ratio sensor 41 has become a temperature near the second temperature $T_2$. In the case where at step S26 it is judged that the temperature of the downstream side air-fuel ratio sensor 41 becomes a temperature near the second temperature $T_2$, the routine proceeds to step S27 where normal control is performed, then the control routine is made to end. On the other hand, if at step S26 it is judged that the temperature of the downstream side air-fuel ratio sensor 41 has become a temperature near the second temperature $T_2$, the routine proceeds to step S28.

At step S28, in the same way as step S16, it is judged if the condition for performing active control stands. When at step S28 it is judged that the condition for performing active control stands, the routine proceeds to step S29 where the target air-fuel ratio is made the air-fuel ratio AFact at the time of active control. Next, at step S30, it is judged if a certain time $\Delta t_0$ has elapsed after active control is started. When at step S30 it is judged that a certain time $\Delta t_0$ has elapsed after active control is started, the routine proceeds to step S31.

At step S31, the output air-fuel ratio AF of the downstream side air-fuel ratio sensor 41 is added to the cumulative value ΣAF of the output air-fuel ratio of the downstream side air-fuel ratio sensor 41. Next, at step S32, it is judged if the certain time $\Delta t_1$ shown in FIG. 14 and FIG. 15 has elapsed. When the certain time $\Delta t_1$ has elapsed, at the next control routine, the routine proceeds to step S33. At step S33, by dividing the cumulative value ΣAF of the output air-fuel ratio of the downstream side air-fuel ratio sensor by the certain time $\Delta t_1$, the average value AF1 of the output air-fuel ratio of the downstream side air-fuel ratio sensor 41 in the certain time $\Delta t_1$ is calculated.

Next, at step S34, it is judged if the difference (AF1−AF0) between the average value AF1 of the output air-fuel ratio when making the temperature of the downstream side air-fuel ratio sensor 41 the second temperature $T_2$ and the average value AF0 of the output air-fuel ratio when making the temperature of the downstream side air-fuel ratio sensor 41 the first temperature $T_1$ is larger than a predetermined value ΔAF (a predetermined value of at least the maximum value which can be taken when the air-fuel ratio sensor does not have a crack of element or more. For example, 1.0 by the difference of the air-fuel ratio). When the difference (AF1−AF0) between the average value AF1 of the output air-fuel ratio and the average value AF0 of the output air-fuel ratio is smaller than the predetermined value ΔAF, it is judged that the downstream side air-fuel ratio sensor 41 does not have a crack of element, then the routine proceeds to step S35. At step S35, it is judged that the downstream side air-fuel ratio sensor 41 is normal, then the routine proceeds to step S37. As opposed to this, when at step S34 the difference of the average value AF1 of the output air-fuel ratio and the average value AF0 of the output air-fuel ratio (AF1−AF0) is larger than the predetermined value ΔAF, it is judged that the downstream side air-fuel ratio sensor 41 has a crack of element, then the routine proceeds to step S36. At step S36, it is judged that the downstream side air-fuel ratio sensor 41 is abnormal, then the routine proceeds to step S37. At step S37, the temperature Is of the downstream side air-fuel ratio sensor 41 is controlled by the sensor temperature control device so as to become the temperature $T_3$ at the time of normal operation (for example, 600° C.). Next, at step S38, the cumulative value ΣAF of the output air-fuel ratio of the downstream side air-fuel ratio sensor 41 is cleared, the low temperature detection flag is reset to OFF, and the control routine is made to end.

Note that, referring to FIG. 17 and FIG. 18, the case of diagnosing abnormality of the downstream side air-fuel ratio sensor 41 was used as an example for the explanation, but it is also possible to diagnose abnormality of the upstream side air-fuel ratio sensor 40 by a method similar to the method explained referring to FIG. 17 and FIG. 18.

Second Embodiment

Next, referring to FIG. 19 to FIG. 22, an abnormality diagnosis system of a second embodiment of the present invention will be explained. The configuration and control of the abnormality diagnosis system of the second embodiment are basically the same as the configuration and control of the abnormality diagnosis system of the first embodiment except for the parts explained below.

In this regard, as explained using FIG. 13, when an air-fuel ratio sensor 40 or 41 has a crack of element, if making the temperature of the air-fuel ratio sensor 40 or 41 a high temperature (for example, 700° C.), when the air-fuel ratio of the exhaust gas around the air-fuel ratio sensor 40 or 41 is made a rich air-fuel ratio, the output air-fuel ratio becomes a lean air-fuel ratio with a large lean degree. On the other hand, if the downstream side air-fuel ratio sensor 41 does not have a crack of element, when the air-fuel ratio of the exhaust gas around the air-fuel ratio sensor 40 or 41 is made a rich air-fuel ratio, if the output air-fuel ratio becomes a lean air-fuel ratio, the lean degree does not become that large. This is because even if there is variation in the air-fuel ratio between cylinders and the air-fuel ratio sensor 40 or 41 does not uniformly contact the exhaust gas flowing out from the cylinders, normally the variation in air-fuel ratio between cylinders does not become that large and even if there is variation in air-fuel ratio between cylinders, the variation is eliminated to a certain extent by the mixture of the exhaust gas. Therefore, when an air-fuel ratio sensor 40 or 41 does not have a crack of element, the result will not become a lean air-fuel ratio with as large a lean degree as the output air-fuel ratio of the air-fuel ratio sensor 40 or 41 when the air-fuel ratio sensor 40 or 41 has a crack of element and the temperature of the air-fuel ratio sensor 40 or 41 is made a high temperature.

Therefore, in the present embodiment, there is provided an abnormality diagnosis system of an air-fuel ratio sensor provided in an exhaust passage of an internal combustion engine and generating a limit current corresponding to the air-fuel ratio, wherein the system comprises a current detecting part 61 detecting an output current I of an air-fuel ratio sensor 40 or 41 and a sensor temperature control device controlling a temperature of an air-fuel ratio sensor 40 or 41, the system uses the sensor temperature control device to control the temperature of the air-fuel ratio sensor 40 or 41 to a first temperature and provisionally judges that the air-fuel ratio sensor 40 or 41 is abnormal when the internal combustion engine controls the air-fuel ratio so that the air-fuel ratio of the exhaust gas flowing around the air-fuel ratio sensor 40 or 41 becomes a rich air-fuel ratio in the state where the temperature of the air-fuel ratio sensor 40 or 41 is made the first temperature if the output current I of the air-fuel ratio sensor 40 or 41 detected by the current detecting part 61 becomes a current value indicating an air-fuel ratio of a predetermined lean air-fuel ratio leaner than the stoichiometric air-fuel ratio or more than the predetermined ratio, the system uses the sensor temperature control device to control the temperature of the air-fuel ratio sensor 40 or 41 to a second temperature higher than the first temperature when it is provisionally judged that the air-fuel ratio sensor 40 or 41 is abnormal and uses the current detecting part 61 to detect the output current of the air-fuel ratio sensor 40 or 41 in the state where the temperature of the air-fuel ratio sensor 40 or 41 is made the second temperature when the internal combustion engine controls the air-fuel ratio so that the air-fuel ratio of the exhaust gas flowing around the air-fuel ratio sensor 40 or 41 becomes a rich air-fuel ratio, and the system finally judges that the air-fuel ratio sensor 40 or 41 has become abnormal when the output current I when controlling the temperature of the air-fuel ratio sensor 40 or 41 to the second temperature becomes a current value indicating an air-fuel ratio of a second lean air-fuel ratio leaner than the first lean air-fuel ratio or more than the second ratio.

Figure 19:
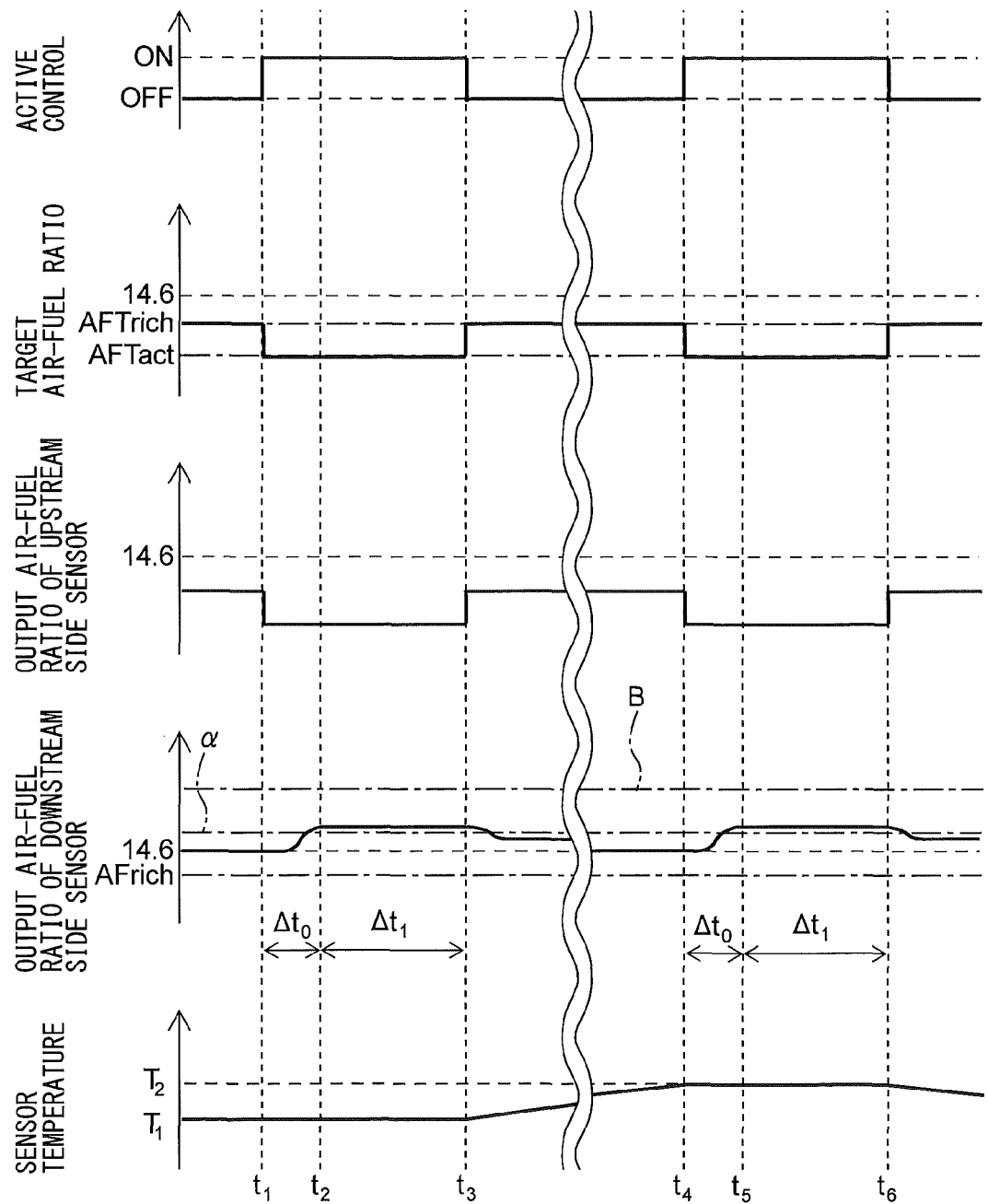
FIG. 19 is a time chart showing a change of an output air-fuel ratio of a downstream side air-fuel ratio sensor, etc., when performing active control.
Figure 20:
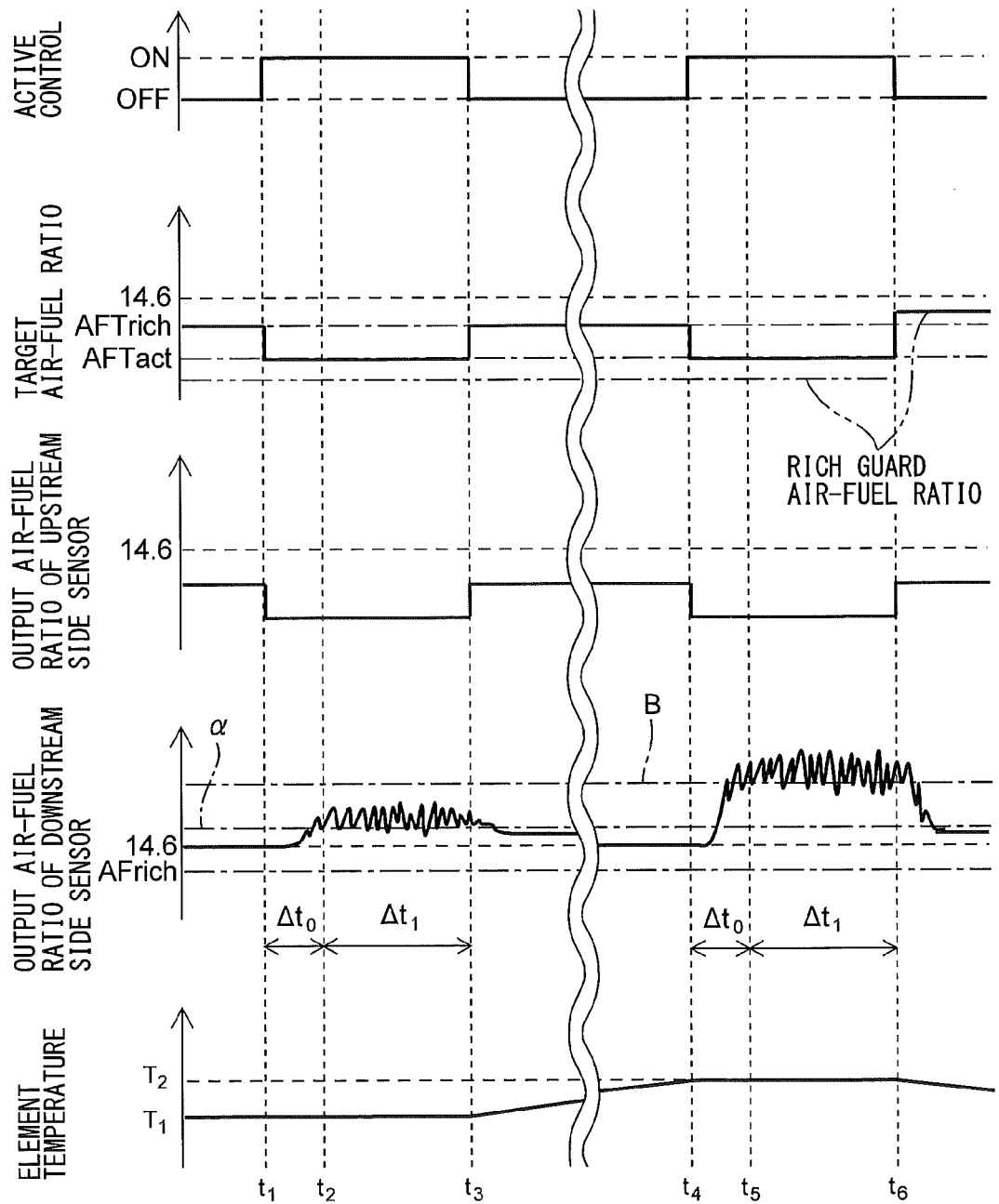
FIG. 20 is a time chart showing a change of an output air-fuel ratio of a downstream side air-fuel ratio sensor, etc., when performing active control.

Next, while referring to the time chart shown in FIG. 19 and FIG. 20, the case of detecting a crack of element of the downstream side air-fuel ratio sensor 41 will be used as an example to explain the diagnosis of abnormality of an air-fuel ratio sensor in the present embodiment. FIG. 19 and FIG. 20 are time charts, similar to FIG. 14 and FIG. 15, showing changes in the target air-fuel ratios, etc. In particular, FIG. 19 shows the case where the downstream side air-fuel ratio sensor 41 does not have a crack of element, but when making the target air-fuel ratio the rich air-fuel ratio, the output air-fuel ratio of the downstream side air-fuel ratio sensor 41 becomes a lean air-fuel ratio. On the other hand, FIG. 20 shows the case where the downstream side air-fuel ratio sensor 41 has a crack of element and therefore when making the target air-fuel ratio α rich air-fuel ratio, the output air-fuel ratio of the downstream side air-fuel ratio sensor 41 becomes a lean air-fuel ratio. Note that, at FIG. 19 and FIG. 20, the presence of active control, the target air-fuel ratio, the output air-fuel ratio of the upstream side air-fuel ratio sensor 40, and the temperature of the downstream side air-fuel ratio sensor 41 change in the same way as the time chart shown in FIG. 14 and FIG. 15, so the explanation of these will be omitted.

The change of the output air-fuel ratio of the downstream side air-fuel ratio sensor 41 when performing active control will be explained. FIG. 19 shows the case where the downstream side air-fuel ratio sensor 41 does not have a crack of element, but when making the target air-fuel ratio the rich air-fuel ratio, the output air-fuel ratio of the downstream side air-fuel ratio sensor 41 becomes leaner than the predetermined first lean judged air-fuel ratio α, for example, 15.0. As an example in such a case, for example, as explained above, there is variation in the air-fuel ratio between cylinders, the air-fuel ratio of a specific cylinder greatly deviates to the rich side from the other cylinders, depending to the shape, etc., of the exhaust passage, sometimes the upstream side air-fuel ratio sensor 40 does not evenly contact the exhaust gas flowing out from the cylinders but mainly contacts the exhaust gas flowing out from the cylinder deviated to the rich side. As an example in such a case, for example, as explained above, there is the case where there is variation in the air-fuel ratio between cylinders, the air-fuel ratio of a specific cylinder greatly deviates to the rich side compared with the other cylinders, and, due to the shape of the exhaust passage, etc., the upstream side air-fuel ratio sensor 40 does not uniformly contact the exhaust gas flowing out from the cylinders, but mainly contacts the exhaust gas flowing out from the cylinder deviated to the rich side.

In such a case, at the time $\Delta t_1$ when the temperature of the downstream side air-fuel ratio sensor 41 is made the first temperature $T_1$, the output air-fuel ratio of the downstream side air-fuel ratio sensor 41 becomes an air-fuel ratio leaner than the first lean judged air-fuel ratio $\alpha$. For this reason, in the example shown in FIG. 19, at the time $t_3$ when time $\Delta t_1$ ends, it is provisionally judged that the downstream side air-fuel ratio sensor 41 is abnormal. If in this way it is provisionally judged that the downstream side air-fuel ratio sensor 41 is abnormal, the temperature of the downstream side air-fuel ratio sensor 41 is made to rise to the second temperature $T_2$.

However, as explained above, in the case such as shown in FIG. 19, even if the temperature of the downstream side air-fuel ratio sensor 41 is made to change from the first temperature $T_1$ to the second temperature $T_2$, the output current I of the downstream side air-fuel ratio sensor 41 does not change that much. That is, the output air-fuel ratio of the downstream side air-fuel ratio sensor 41 does not change that much at all. As a result, at the time $\Delta t_2$ when the temperature of the downstream side air-fuel ratio sensor 41 is made the second temperature $T_2$, the output air-fuel ratio of the downstream side air-fuel ratio sensor 41 becomes a predetermined second lean judged air-fuel ratio $\beta$ leaner than the first lean judged air-fuel ratio $\alpha$, for example, an air-fuel ratio richer than 16.5. That is, at the time $\Delta t_2$, the output current of the downstream side air-fuel ratio sensor 41 becomes a current value indicating an air-fuel ratio lower than the second lean judged air-fuel ratio $\beta$.

On the other hand, FIG. 20 shows the case where when the downstream side air-fuel ratio sensor 41 having a crack of element causes the output air-fuel ratio of the downstream side air-fuel ratio sensor 41 to become leaner than a predetermined first lean judged air-fuel ratio $\alpha$, for example, 15.0, when making the target air-fuel ratio $\alpha$ rich air-fuel ratio. In this case, as explained above, rather than the time $\Delta t_1$ when the temperature of the downstream side air-fuel ratio sensor 41 is the first temperature $T_1$, at the time $\Delta t_2$ when it is the second temperature $T_2$, the output air-fuel ratio of the downstream side air-fuel ratio sensor 41 becomes lean and becomes an air-fuel ratio of the second lean judged air-fuel ratio $\beta$, for example, 16.5, or more. Therefore, in the state where the target air-fuel ratio A/F is made the rich air-fuel ratio, that is, in the state where the air-fuel ratio of the exhaust gas flowing around the downstream side air-fuel ratio sensor 41 is made the rich air-fuel ratio, the output air-fuel ratio of the downstream side air-fuel ratio sensor 41 when the temperature of the downstream side air-fuel ratio sensor 41 is made $T_2$ may be used to accurately judge if the downstream side air-fuel ratio sensor 41 has a crack of element.

Here, in diagnosing abnormality of an air-fuel ratio sensor 40 or 41, it may also be considered to raise the temperature of the air-fuel ratio sensor 40 or 41 to the second temperature $T_2$ from the start. However, raising the temperature of the air-fuel ratio sensor 40 or 41 requires energy, so needlessly making the air-fuel ratio sensor 40 or 41 rise to a high temperature will lead to poorer fuel economy. In the present embodiment, first the temperature of the air-fuel ratio sensor 40 or 41 is made the first temperature $T_1$. Only when it is provisionally judged in that state that the downstream side air-fuel ratio sensor 41 is abnormal, the temperature of the air-fuel ratio sensor 40 or 41 is made to rise to the second temperature $T_2$. Conversely, at the time $\Delta t_1$ where the temperature of the downstream side air-fuel ratio sensor 41 is made the first temperature $T_1$, if the output air-fuel ratio of the downstream side air-fuel ratio sensor 41 is not leaner than the predetermined lean judged air-fuel ratio $\alpha$, it can be judged that the downstream side air-fuel ratio sensor 41 does not have a crack of element. For this reason, in such a case, the diagnosis of abnormality of the downstream side air-fuel ratio sensor 41 is made to end. Therefore, in such a case, the temperature of the downstream side air-fuel ratio sensor 41 is not made to rise to the second temperature $T_2$ such as in FIG. 19 and FIG. 20. For this reason, according to the present embodiment, it is possible to suppress deterioration of the fuel economy.

Note that, as will be understood from FIG. 7, when the diameter of the through hole which is made in the air-fuel ratio sensor 40 or 41 is 0.5 mm, the output current I when the exhaust air-fuel ratio A/F is the rich air-fuel ratio is larger compared with when the diameter of the through hole is 0.2 mm. That is, the larger the diameter of the through hole which is formed in the air-fuel ratio sensor 40 or 41, the larger the output current when the exhaust air-fuel ratio A/F is the rich air-fuel ratio. In other words, the larger the crack of element which occurs at the air-fuel ratio sensor 40 or 41, the larger the output current when the exhaust air-fuel ratio A/F is the rich air-fuel ratio. For this reason, when the air-fuel ratio sensor 40 or 41 has a large crack of element, the output air-fuel ratio of the downstream side air-fuel ratio sensor 41 becomes the second lean judged air-fuel ratio $\beta$ or more without making the temperature of the downstream side air-fuel ratio sensor 41 rise to the second temperature $T_2$ even if made the state of the first temperature $T_1$. For this reason, even if the temperature of the downstream side air-fuel ratio sensor 41 is not raised to the second temperature $T_2$, it is possible to judge that the downstream side air-fuel ratio sensor 41 has a crack of element.

Therefore, in the present embodiment, when the output air-fuel ratio of the downstream side air-fuel ratio sensor 41 becomes the second lean judged air-fuel ratio $\beta$ or more, in the state where the temperature of the downstream side air-fuel ratio sensor 41 is made the first temperature $T_1$, it is judged that the downstream side air-fuel ratio sensor 41 has the abnormality of a crack of element. Therefore, in this case, the abnormality of a crack of element of the downstream side air-fuel ratio sensor 41 is judged without raising the temperature of the downstream side air-fuel ratio sensor 41 to the second temperature $T_2$. That is, in the present embodiment, when the air-fuel ratio is controlled so that the air-fuel ratio of the exhaust gas flowing around the air-fuel ratio sensor 40 or 41 becomes the rich air-fuel ratio in the state where the temperature of the air-fuel ratio sensor 40 or 41 is made the first temperature $T_1$, if the output current I of the air-fuel ratio sensor 40 or 41 becomes a current value indicating an air-fuel ratio of the second lean judged air-fuel ratio $\beta$ or more, it is judged that the air-fuel ratio sensor 40 or 41 is abnormal.

Further, the output current I of the downstream side air-fuel ratio sensor 41 fluctuates as shown in FIG. 8B and the output air-fuel ratio of the downstream side air-fuel ratio sensor 41 fluctuates as shown in FIG. 20. Therefore, it can be said to be preferable to judge whether the output current I of the downstream side air-fuel ratio sensor 41 or the output air-fuel ratio of the downstream side air-fuel ratio sensor 41 is the first lean judged air-fuel ratio $\alpha$ or the second lean judged air-fuel ratio $\beta$ or more based on the trend in the output air-fuel ratio of the downstream side air-fuel ratio sensor 41 in a certain extent of time.

Therefore, in the present embodiment, when the time period where the output air-fuel ratio of the air-fuel ratio sensor 40 or 41 is an air-fuel ratio of the first lean air-fuel ratio α or more is a predetermined ratio (50% or more) or more of the diagnosis time period of the air-fuel ratio sensor 40 or 41 (for example, the times $t_2$ to $t_3$ of FIG. 20), it is judged that the output air-fuel ratio of the air-fuel ratio sensor 40 or 41 is the first lean judged air-fuel ratio α or more. Similarly, when the time period where the output air-fuel ratio of the air-fuel ratio sensor 40 or 41 is an air-fuel ratio of the second lean air-fuel ratio β or more of the diagnosis time period of the air-fuel ratio sensor 40 or 41 (for example, the times $t_5$ to $t_6$ of FIG. 20) is a predetermined ratio (50% or more) or more, it is judged that the output air-fuel ratio of the air-fuel ratio sensor 40 or 41 is the second lean judged air-fuel ratio β or more.

That is, in the present embodiment, when the ratio of the time period where the output current of the air-fuel ratio sensor 40 or 41 becomes a current value indicating an air-fuel ratio of the first lean air-fuel ratio α or more becomes a predetermined ratio of more of the diagnosis period during which the air-fuel ratio is controlled so that the air-fuel ratio of the exhaust gas flowing around the air-fuel ratio sensor 40 or 41 becomes the rich air-fuel ratio in the state where the temperature of the air-fuel ratio sensor 40 or 41 is made the first temperature $T_1$, it is judged that the output current of the air-fuel ratio sensor 40 or 41 is a current value indicating an air-fuel ratio of the first lean air-fuel ratio α or more while when the ratio of the time period where the output current of the air-fuel ratio sensor 40 or 41 becomes a current value indicating an air-fuel ratio of the second lean air-fuel ratio β or more becomes a predetermined ratio or more of the diagnosis period during which the air-fuel ratio is controlled so that the air-fuel ratio of the exhaust gas flowing around the air-fuel ratio sensor 40 or 41 becomes the rich air-fuel ratio in the state where the temperature of the air-fuel ratio sensor 40 or 41 is made the second temperature $T_2$, it is judged that the output current I of the air-fuel ratio sensor is a current value indicating an air-fuel ratio of the second lean air-fuel ratio β or more.

Note that, when diagnosing abnormality of the downstream side air-fuel ratio sensor 41, in the same way as the above-mentioned first embodiment, it is possible to use an average value of the output air-fuel ratio of the downstream side air-fuel ratio sensor 41 in a certain time $\Delta t_1$.

<Flow Chart>

Figure 21:
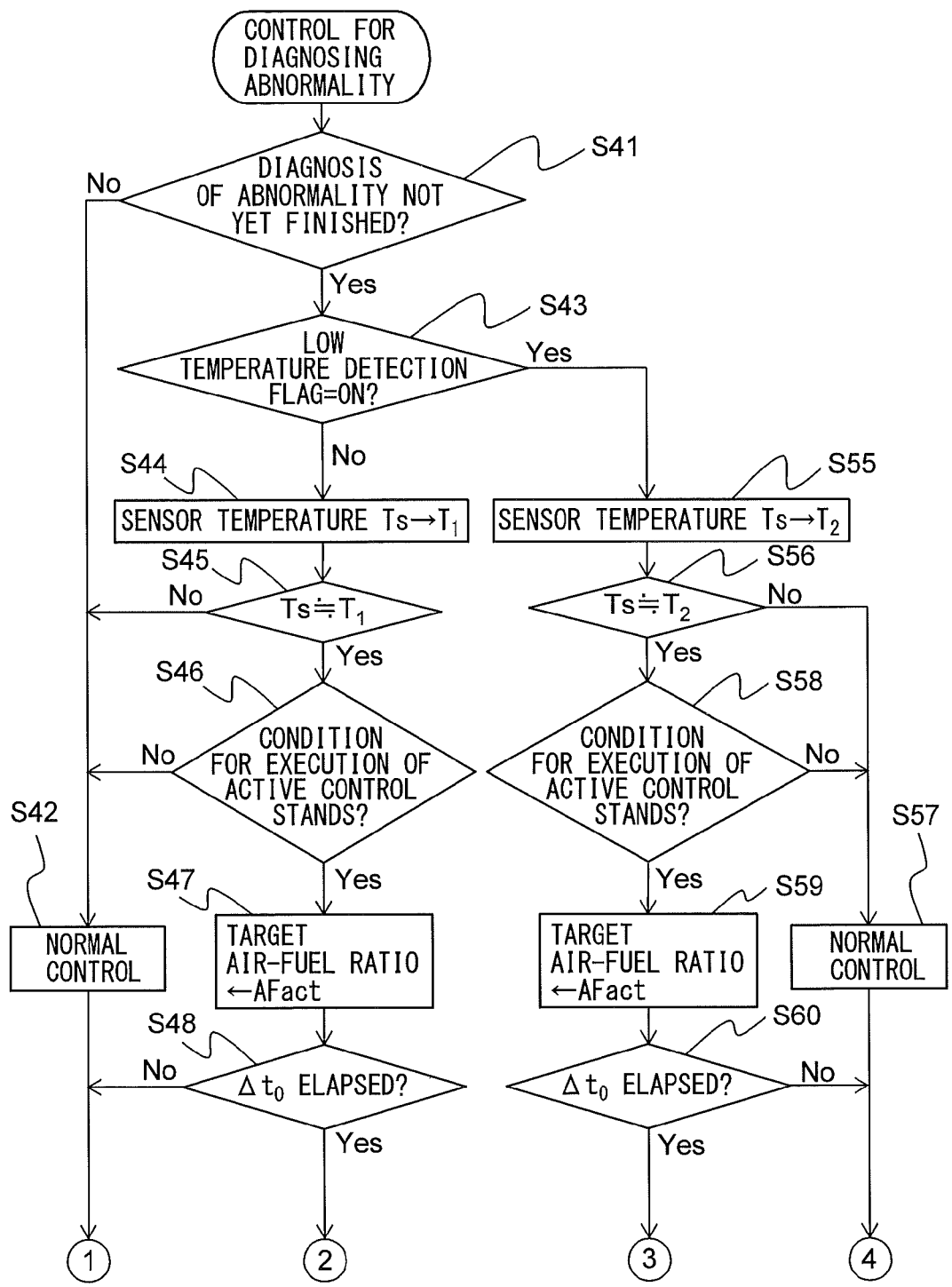
FIG. 21 is a flow chart for diagnosis of abnormality of a downstream side air-fuel ratio sensor.
Figure 22:
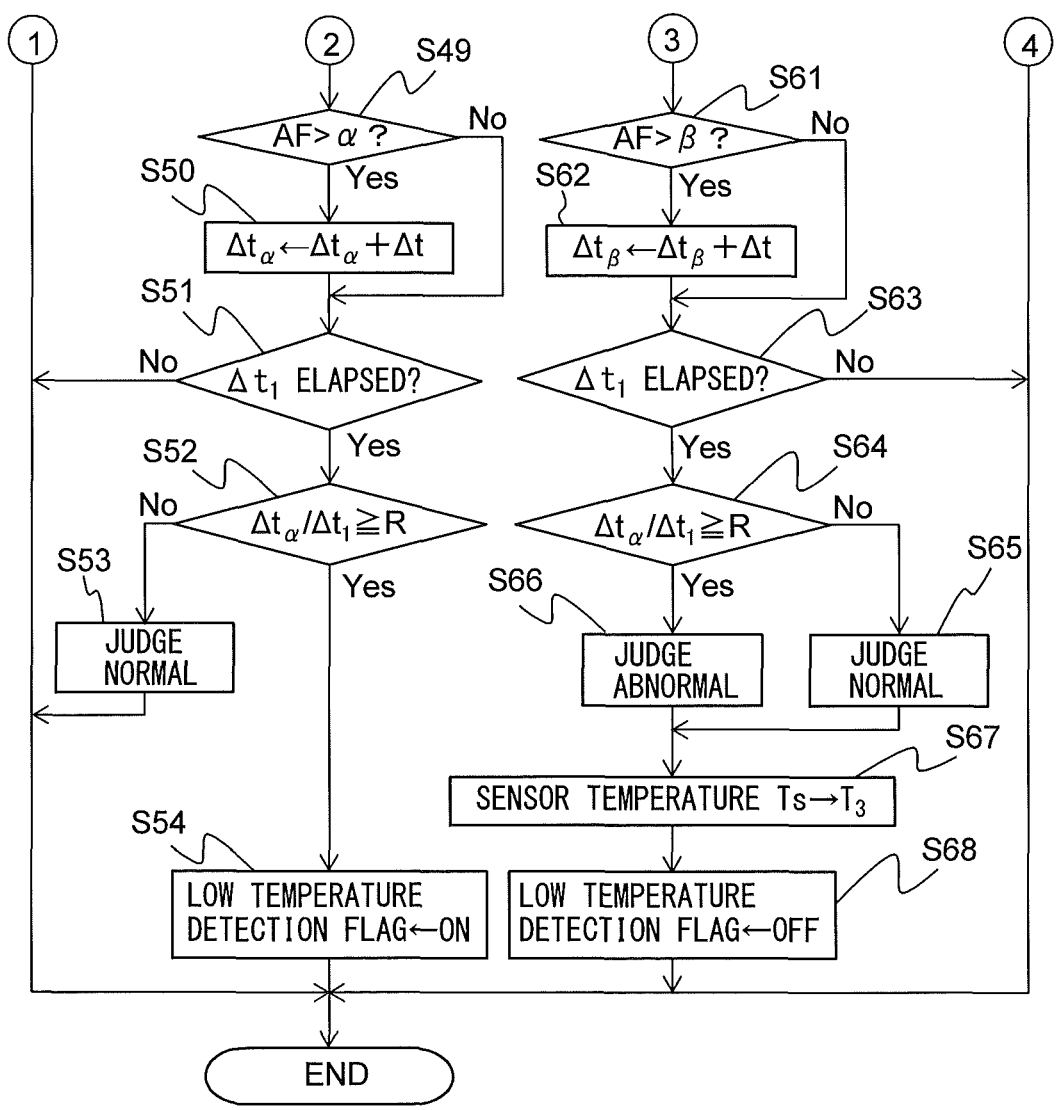
FIG. 22 is a flow chart for diagnosis of abnormality of a downstream side air-fuel ratio sensor.

FIG. 21 and FIG. 22 show an abnormality diagnosis routine of the downstream side air-fuel ratio sensor 41. This routine is performed by interruption every predetermined time interval. Note that, steps S41 to S47 and steps S55 to S59 of FIG. 21 and FIG. 22 are respectively similar to steps S11 to S17 and steps S25 to S29 of FIG. 17 and FIG. 18, so explanations will be omitted.

At step S48, after active control is started, it is judged if a certain time $\Delta t_0$ has elapsed. When a certain time $\Delta t_0$ has not elapsed after active control is started, the control routine is made to end. On the other hand, when a certain time $\Delta t_0$ has elapsed after active control is started, the routine proceeds to step S49. At step S49, it is judged if the output air-fuel ratio AF of the downstream side air-fuel ratio sensor 41 is leaner than a predetermined first lean judged air-fuel ratio α, for example, 15.0, that is, if the output current I of the downstream side air-fuel ratio sensor 41 has become larger than the set current value corresponding to this first lean judged air-fuel ratio α.

When at step S49 it is judged that the output air-fuel ratio AF of the downstream side air-fuel ratio sensor 41 is larger than a predetermined first lean judged air-fuel ratio α, that is, when it is judged that the output current I of the downstream side air-fuel ratio sensor 41 is larger than a set current value corresponding to this first lean judged air-fuel ratio α, the routine proceeds to step S50. At step S50, a slight time Δt (corresponding to interval of interruption of control routine) is added to the cumulative time $\Delta t_\alpha$, then the routine proceeds to step S51. On the other hand, when at step S49 the output air-fuel ratio AF of the downstream side air-fuel ratio sensor 41 is smaller than the first lean judged air-fuel ratio α, that is, when the output current I of the downstream side air-fuel ratio sensor 41 is lower than the set current value corresponding to this first lean judged air-fuel ratio α, step S50 is skipped.

At step S51, it is judged if a certain time $\Delta t_1$ shown in FIG. 19 and FIG. 20 has elapsed. When a certain time $t_1$ has not elapsed, the control routine is made to end. On the other hand, when the certain time $\Delta t_1$ has elapsed, at the next control routine, the routine proceeds from step S51 to step S52. At step S52, it is judged if the cumulative time $\Delta t_\alpha$ divided by a certain time $\Delta t_1$, that is, the ratio of the time when the output air-fuel ratio AF of the downstream side air-fuel ratio sensor 41 is larger than the first lean judged air-fuel ratio α, is a predetermined ratio R, for example, 70 percent, or more. If it is judged that the cumulative time $\Delta t_\alpha$ divided by a certain time $\Delta t_1$ is smaller than the predetermined ratio R, it is judged that the downstream side air-fuel ratio sensor 41 does not have a crack of element. Therefore, at this time, the routine proceeds to step S53 where it is judged that the downstream side air-fuel ratio sensor 41 is normal. On the other hand, when at step S52 it is judged that the cumulative time $\Delta t_\alpha$ divided by a certain time $\Delta t_1$ is smaller than a predetermined ratio R, it is provisionally judged that the downstream side air-fuel ratio sensor 41 has an abnormality, then the routine proceeds to step S54. At step S54, the low temperature detection flag is set ON, then the control routine is made to end.

At step S60, it is judged if a certain time $\Delta t_0$ has elapsed after active control is started. When a certain time $\Delta t_0$ has elapsed after active control is started, the routine proceeds to step S61. At step S61, it is judged whether the output air-fuel ratio AF of the downstream side air-fuel ratio sensor 41 is leaner than a predetermined second lean judged air-fuel ratio β, for example, 16.5, that is, if the output current I of the downstream side air-fuel ratio sensor 41 has become larger than the set current value corresponding the second lean judged air-fuel ratio β.

When, at step S61, it is judged that the output air-fuel ratio AF of the downstream side air-fuel ratio sensor 41 is larger than the predetermined second lean judged air-fuel ratio β, that is, when it is judged that the output current I of the downstream side air-fuel ratio sensor 41 is larger than a set current value corresponding to the second lean judged air-fuel ratio β, the routine proceeds to step S62. At step S62, the cumulative time $\Delta t_\beta$ is increased by the slight time Δt (corresponding to interval of interruption of control routine) and the routine proceeds to step S63. On the other hand, when at step S61 the output air-fuel ratio AF of the downstream side air-fuel ratio sensor 41 is smaller than the second lean judged air-fuel ratio β, that is, when the output current I of the downstream side air-fuel ratio sensor 41 is lower than the set current value corresponding to the second lean judged air-fuel ratio β, step S62 is skipped.

At step S63, it is judged if a certain time $\Delta t_1$ shown in FIG. 19 and FIG. 20 has elapsed. When the certain time $t_1$ has not elapsed, the control routine is made to end. On the other hand, when a certain time $\Delta t_1$ elapses, at the next control routine, the routine proceeds from step S63 to step S64. At step S64, it is judged if the cumulative time $\Delta t_\beta$ divided by a certain time $\Delta t_1$, that is, the ratio of the time when the output air-fuel ratio AF of the downstream side air-fuel ratio sensor 41 is larger than the second lean judged air-fuel ratio β, is a predetermined ratio R, for example, 70 percent or more. When it is judged that the cumulative time $\Delta t_\alpha$ divided by a certain time $\Delta t_1$ is smaller than the predetermined ratio R, it is judged that the downstream side air-fuel ratio sensor 41 does not have a crack of element. Therefore, at this time, the routine proceeds to step S65 where it is judged that the downstream side air-fuel ratio sensor 41 is normal. On the other hand, when, at step S64, it is judged that the cumulative time $\Delta t_\beta$ divided by a certain time $\Delta t_1$ is smaller than a predetermined ratio R, it is judged that the downstream side air-fuel ratio sensor 41 is abnormal. Therefore, at this time, the routine proceeds to step S66 where it is judged that the downstream side air-fuel ratio sensor 41 has an abnormality of a crack of element. Next, at step S67, the temperature Ts of the downstream side air-fuel ratio sensor 41 is controlled by the sensor temperature control device so as to become the temperature $T_3$ (for example, 600° C.) at the time of normal operation. Next, at step S68, when the low temperature detection flag is reset to OFF, the control routine is made to end.

Note that, referring to FIG. 21 and FIG. 22, the case of diagnosing abnormality of the downstream side air-fuel ratio sensor 41 was used as an example for explanation, but the diagnosis of abnormality of the upstream side air-fuel ratio sensor 40 may also be performed by a method similar to the method explained with reference to FIG. 21 and FIG. 22.

Note that, in the above embodiments, active control was performed to make the air-fuel ratio of the exhaust gas around the air-fuel ratio sensor 40 or 41 the rich air-fuel ratio sensor so as to diagnose abnormality of the air-fuel ratio sensor 40 or 41. However, it is not necessarily required to perform active control when diagnosing abnormality of the air-fuel ratio sensor 40 or 41. Therefore, when diagnosing abnormality of the upstream side air-fuel ratio sensor 40, it is also possible to diagnose abnormality, for example, during normal control, when the air-fuel ratio is controlled so that the air-fuel ratio of the exhaust gas around the upstream side air-fuel ratio sensor 40 becomes the rich air-fuel ratio, that is, when the target air-fuel ratio is set to the rich air-fuel ratio.

The invention claimed is:

1. An abnormality diagnosis system of an air-fuel ratio sensor provided in an exhaust passage of an internal combustion engine and generating a limit current corresponding to an air-fuel ratio, comprising:
a current detecting part detecting an output current of said air-fuel ratio sensor; and a sensor temperature control device controlling a temperature of said air-fuel ratio sensor,
said system is programmed to control the temperature of said air-fuel ratio sensor to a first temperature by said sensor temperature control device, and to detect the output current of said air-fuel ratio sensor by said current detecting part, when said internal combustion engine controls the air-fuel ratio so that the air-fuel ratio of the exhaust gas flowing around said air-fuel ratio sensor becomes a rich air-fuel ratio in the state where the temperature of said air-fuel ratio sensor is made the first temperature,
said system is programmed to control the temperature of said air-fuel ratio sensor to a second temperature higher than said first temperature by said sensor temperature control device, and to detect the output current of said air-fuel ratio sensor by said current detecting part, when said internal combustion engine controls the air-fuel ratio so that the air-fuel ratio of the exhaust gas flowing around said air-fuel ratio sensor becomes a rich air-fuel ratio in the state where the temperature of said air-fuel ratio sensor is made said second temperature, and
said system is programmed to judge that said air-fuel ratio sensor has become abnormal when the output current when controlling the temperature of said air-fuel ratio sensor to said first temperature is larger than the output current when controlling the temperature of said air-fuel ratio sensor to said second temperature by a predetermined value or more.

2. The abnormality diagnosis system of an air-fuel ratio sensor according to claim 1, wherein
said system is configured to provisionally judge said air-fuel ratio sensor is abnormal when said internal combustion engine controls the air-fuel ratio so that the air-fuel ratio of the exhaust gas flowing around said air-fuel ratio sensor becomes a rich air-fuel ratio in the state where the temperature of said air-fuel ratio sensor is made said first temperature, if the output current of said air-fuel ratio sensor has become a current value indicating an air-fuel ratio equal to or greater than a predetermined lean air-fuel ratio leaner than the stoichiometric air-fuel ratio,
said system is configured, when it is provisionally judged that said air-fuel ratio sensor is abnormal, to control the temperature of said air-fuel ratio sensor to said second temperature, and to detect the output current of said air-fuel ratio sensor by said current detecting part when said internal combustion engine controls the air-fuel ratio so that the air-fuel ratio of the exhaust gas flowing around said air-fuel ratio sensor becomes a rich air-fuel ratio in the state where the temperature of said air-fuel ratio sensor is made said second temperature, and
said system is configured to finally judge that said air-fuel ratio sensor has become abnormal when the output current when controlling the temperature of said air-fuel ratio sensor to said first temperature is larger than the output current when controlling the temperature of said air-fuel ratio sensor to said second temperature by a predetermined value or more.

3. An abnormality diagnosis system of an air-fuel ratio sensor provided in an exhaust passage of an internal combustion engine and generating a limit current corresponding to an air-fuel ratio, comprising:
a current detecting part detecting an output current of said air-fuel ratio sensor; and a sensor temperature control device controlling a temperature of said air-fuel ratio sensor,
said system is programmed to control a temperature of said air-fuel ratio sensor to a first temperature by said sensor temperature control device, and to provisionally judge that said air-fuel ratio sensor is abnormal when said internal combustion engine controls the air-fuel ratio so that the air-fuel ratio of the exhaust gas flowing around said air-fuel ratio sensor becomes a rich air-fuel ratio richer than the stoichiometric air-fuel ratio in the state where the temperature of said air-fuel ratio sensor is made the first temperature, if the output current of said air-fuel ratio sensor detected by said current detecting part becomes a current value indicating an air-fuel ratio equal to or greater than a predetermined first lean air-fuel ratio leaner than the stoichiometric air-fuel ratio, said system is programmed to control the temperature of said air-fuel ratio sensor to a second temperature higher than said first temperature by said sensor temperature control device when it is provisionally judged that said air-fuel ratio sensor is abnormal, and to detect the output current of said air-fuel ratio sensor by said current detecting part when said internal combustion engine controls the air-fuel ratio so that the air-fuel ratio of the exhaust gas flowing around said air-fuel ratio sensor becomes a rich air-fuel ratio in the state where the temperature of said air-fuel ratio sensor is made said second temperature, and said system is programmed to finally judge that said air-fuel ratio sensor has become abnormal when the output current when controlling the temperature of said air-fuel ratio sensor to said second temperature becomes a current value indicating an air-fuel ratio equal to or greater than a second lean air-fuel ratio leaner than said first lean air-fuel ratio.

4. The abnormality diagnosis system of an air-fuel ratio sensor according to claim 3, wherein said system is configured to finally judge that said air-fuel ratio sensor is abnormal if the output current of said air-fuel ratio sensor becomes a current value indicating an air-fuel ratio equal to or greater than said second lean air-fuel ratio when the air-fuel ratio is controlled so that the air-fuel ratio of the exhaust gas flowing around said air-fuel ratio sensor becomes a rich air-fuel ratio in the state where the temperature of said air-fuel ratio sensor is made said first temperature.

5. The abnormality diagnosis system of an air-fuel ratio sensor according to claim 1, wherein said internal combustion engine is provided with an exhaust purification catalyst in its exhaust passage and can control the air-fuel ratio so that the air-fuel ratio of the exhaust gas flowing into said exhaust purification catalyst becomes a target air-fuel ratio, and said system is configured to lower a lower limit value of said target air-fuel ratio which can be set, when it is provisionally judged or finally judged that said air-fuel ratio sensor is abnormal.

6. The abnormality diagnosis system of an air-fuel ratio sensor according to claim 3, wherein said internal combustion engine is provided with an exhaust purification catalyst in its exhaust passage and can control the air-fuel ratio so that the air-fuel ratio of the exhaust gas flowing into said exhaust purification catalyst becomes a target air-fuel ratio, and said system is configured to lower a lower limit value of said target air-fuel ratio which can be set, when it is provisionally judged or finally judged that said air-fuel ratio sensor is abnormal.

7. The abnormality diagnosis system of an air-fuel ratio sensor according to claim 1, wherein said internal combustion engine comprises an exhaust purification catalyst arranged in the exhaust passage, an upstream side air-fuel ratio sensor arranged upstream of said exhaust purification catalyst in said exhaust passage, and a downstream side air-fuel ratio sensor arranged at a downstream side, in the direction of exhaust flow, of said exhaust purification catalyst, and said downstream side air-fuel ratio sensor is said limit current type air-fuel ratio sensor.

8. The abnormality diagnosis system of an air-fuel ratio sensor according to claim 3, wherein said internal combustion engine comprises an exhaust purification catalyst arranged in the exhaust passage, an upstream side air-fuel ratio sensor arranged upstream of said exhaust purification catalyst in said exhaust passage, and a downstream side air-fuel ratio sensor arranged at a downstream side, in the direction of exhaust flow, of said exhaust purification catalyst, and said downstream side air-fuel ratio sensor is said limit current type air-fuel ratio sensor.

9. The abnormality diagnosis system of an air-fuel ratio sensor according to claim 1, wherein said internal combustion engine comprises an exhaust purification catalyst arranged in the exhaust passage, an upstream side air-fuel ratio sensor arranged upstream of said exhaust purification catalyst in said exhaust passage, and a downstream side air-fuel ratio sensor arranged at a downstream side, in the direction of exhaust flow, of said exhaust purification catalyst, and said upstream side air-fuel ratio sensor is said limit current type air-fuel ratio sensor.

10. The abnormality diagnosis system of an air-fuel ratio sensor according to claim 3, wherein said internal combustion engine comprises an exhaust purification catalyst arranged in the exhaust passage, an upstream side air-fuel ratio sensor arranged upstream of said exhaust purification catalyst in said exhaust passage, and a downstream side air-fuel ratio sensor arranged at a downstream side, in the direction of exhaust flow, of said exhaust purification catalyst, and said upstream side air-fuel ratio sensor is said limit current type air-fuel ratio sensor.

11. The abnormality diagnosis system of an air-fuel ratio sensor according to claim 1, wherein said internal combustion engine comprises an exhaust purification catalyst in the exhaust passage, controls the air-fuel ratio so that the air-fuel ratio of the exhaust gas flowing to said exhaust purification catalyst becomes the target air-fuel ratio, and can perform normal control alternately changing said target air-fuel ratio between the rich air-fuel ratio and a lean air-fuel ratio leaner than the stoichiometric air-fuel ratio; and active control making said target air-fuel ratio richer than the rich air-fuel ratio at the time of said normal control, and when the air-fuel ratio is controlled so that the air-fuel ratio of the exhaust gas flowing around said air-fuel ratio sensor becomes the rich air-fuel ratio, said active control is being executed.

12. The abnormality diagnosis system of an air-fuel ratio sensor according to claim 3, wherein said internal combustion engine comprises an exhaust purification catalyst in the exhaust passage, controls the air-fuel ratio so that the air-fuel ratio of the exhaust gas flowing to said exhaust purification catalyst becomes the target air-fuel ratio, and can perform normal control alternately changing said target air-fuel ratio between the rich air-fuel ratio and a lean air-fuel ratio leaner than the stoichiometric air-fuel ratio; and active control making said target air-fuel ratio richer than the rich air-fuel ratio at the time of said normal control, and when the air-fuel ratio is controlled so that the air-fuel ratio of the exhaust gas flowing around said air-fuel ratio sensor becomes the rich air-fuel ratio, said active control is being executed.

13. The abnormality diagnosis system of an air-fuel ratio sensor according to claim 1, wherein said internal combustion engine comprises an exhaust purification catalyst in the exhaust passage, controls the air-fuel ratio so that the air-fuel ratio of the exhaust gas flowing to said exhaust purification catalyst becomes the target air-fuel ratio, and can perform normal control alternately changing said target air-fuel ratio between the rich air-fuel ratio and a lean air-fuel ratio leaner than the stoichiometric air-fuel ratio, and the time when the air-fuel ratio is controlled so that the air-fuel ratio of the exhaust gas flowing around said air-fuel ratio sensor becomes a rich air-fuel ratio is the time when said target air-fuel ratio is made a rich air-fuel ratio during said normal control.

14. The abnormality diagnosis system of an air-fuel ratio sensor according to claim 3, wherein said internal combustion engine comprises an exhaust purification catalyst in the exhaust passage, controls the air-fuel ratio so that the air-fuel ratio of the exhaust gas flowing to said exhaust purification catalyst becomes the target air-fuel ratio, and can perform normal control alternately changing said target air-fuel ratio between the rich air-fuel ratio and a lean air-fuel ratio leaner than the stoichiometric air-fuel ratio, and the time when the air-fuel ratio is controlled so that the air-fuel ratio of the exhaust gas flowing around said air-fuel ratio sensor becomes a rich air-fuel ratio is the time when said target air-fuel ratio is made a rich air-fuel ratio during said normal control.

15. The abnormality diagnosis system of an air-fuel ratio sensor according to claim 1, wherein the output current when controlling the temperature of said air-fuel ratio sensor used for judgment of abnormality of said air-fuel ratio sensor is an average value of the output current of said air-fuel ratio sensor when controlling the temperature of said air-fuel ratio sensor to said first temperature or said second temperature.

16. The abnormality diagnosis system of an air-fuel ratio sensor according to claim 3, wherein the output current when controlling the temperature of said air-fuel ratio sensor used for judgment of abnormality of said air-fuel ratio sensor is an average value of the output current of said air-fuel ratio sensor when controlling the temperature of said air-fuel ratio sensor to said first temperature or said second temperature.

17. The abnormality diagnosis system of an air-fuel ratio sensor according to claim 3, wherein when the ratio of the time period where the output current of the air-fuel ratio sensor becomes a current value indicating an air-fuel ratio equal to or greater than said first lean air-fuel ratio with respect to the diagnosis period during which the air-fuel ratio is controlled so that the air-fuel ratio of the exhaust gas flowing around the air-fuel ratio sensor becomes the rich air-fuel ratio in the state where the temperature of the air-fuel ratio sensor is made said first temperature, becomes equal to or greater than a predetermined ratio, it is judged that an output current of said air-fuel ratio sensor has become a current value indicating an air-fuel ratio equal to or greater than said first lean air-fuel ratio, and when the ratio of the time period where the output current of the air-fuel ratio sensor becomes a current value indicating an air-fuel ratio equal to or greater than said second lean air-fuel ratio with respect to the diagnosis period during which the air-fuel ratio is controlled so that the air-fuel ratio of the exhaust gas flowing around the air-fuel ratio sensor becomes the rich air-fuel ratio in the state where the temperature of the air-fuel ratio sensor is made said second temperature, becomes equal to or greater than a predetermined ratio, it is judged that an output current of said air-fuel ratio sensor has become a current value indicating an air-fuel ratio equal to or greater than said second lean air-fuel ratio.

* * * * *

UNITED STATES PATENT AND TRADEMARK OFFICE
CERTIFICATE OF CORRECTION

PATENT NO. : 9,903,292 B2  
APPLICATION NO. : 14/921198  
DATED : February 27, 2018  
INVENTOR(S) : Hiroshi Miyamoto et al.

Page 1 of 1

It is certified that error appears in the above-identified patent and that said Letters Patent is hereby corrected as shown below:

In the Specification

At Column 08, Line 56, change "$Bi_2O_2$" to "$Bi_2O_3$"

At Column 08, Line 57, change "$Y_2O_2$, $Yb_2O_2$" to "$Y_2O_3$, $Yb_2O_3$"

At Column 27, Line 03, change "temperature Is of" to "temperature Ts of"

Signed and Sealed this  
Eleventh Day of September, 2018

Andrei Iancu  
*Director of the United States Patent and Trademark Office*